(12) United States Patent
Drugeon et al.

(10) Patent No.: US 10,848,760 B2
(45) Date of Patent: Nov. 24, 2020

(54) ENCODING DEVICE, DECODING DEVICE, ENCODING METHOD, AND DECODING METHOD

(71) Applicant: Panasonic Intellectual Property Corporation of America, Torrance, CA (US)

(72) Inventors: Virginie Drugeon, Darmstadt (DE); Takahiro Nishi, Nara (JP); Ryuichi Kanoh, Osaka (JP); Tadamasa Toma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/915,588

(22) Filed: Mar. 8, 2018

(65) Prior Publication Data
US 2018/0316918 A1 Nov. 1, 2018

Related U.S. Application Data

(60) Provisional application No. 62/469,638, filed on Mar. 10, 2017.

(51) Int. Cl.
*H04N 19/117* (2014.01)
*H04N 19/105* (2014.01)
(Continued)

(52) U.S. Cl.
CPC ......... *H04N 19/117* (2014.11); *H04N 19/105* (2014.11); *H04N 19/159* (2014.11);
(Continued)

(58) Field of Classification Search
CPC .. H04N 19/117; H04N 19/463; H04N 19/467; H04N 19/159; H04N 19/176; H04N 19/82; H04N 19/105
See application file for complete search history.

(56) References Cited

U.S. PATENT DOCUMENTS

2003/0206594 A1* 11/2003 Zhou ............... H04N 19/105
375/240.16
2003/0231795 A1* 12/2003 Karczewicz ......... H04N 19/197
382/238
(Continued)

OTHER PUBLICATIONS

H.265 (ISO/IEC 23008-2 High Efficiency video coding (HEVC)), Dec. 1, 2013.

*Primary Examiner* — Joseph Suh
(74) *Attorney, Agent, or Firm* — Wenderoth, Lind & Ponack, L.L.P.

(57) ABSTRACT

An encoding device which further improves coding technique includes processing circuitry and memory. By using the memory, the processing circuitry: performs filtering on a pixel value of a current reference sample to be processed included in reference samples located on a left of or above a current block to be predicted, using pixel values of the reference samples; generates a prediction image by performing intra prediction using the filtered pixel value of the current reference sample. When performing the filtering, the processing circuitry: determines a weight for each reference sample, based on a distance between the reference sample and the current reference sample and a difference in pixel value between the same; and performs filtering on the pixel value of the current reference sample by weighted addition using each of the pixel values of the reference samples and the weight determined for each reference sample.

20 Claims, 35 Drawing Sheets

(51) Int. Cl.
*H04N 19/82* (2014.01)
*H04N 19/176* (2014.01)
*H04N 19/159* (2014.01)
*H04N 19/463* (2014.01)
*H04N 19/467* (2014.01)

(52) U.S. Cl.
CPC ......... *H04N 19/176* (2014.11); *H04N 19/463* (2014.11); *H04N 19/467* (2014.11); *H04N 19/82* (2014.11)

(56) References Cited

U.S. PATENT DOCUMENTS

| | | | |
|---|---|---|---|
| 2006/0153292 A1* | 7/2006 | Liang | H04N 19/176 375/240.2 |
| 2013/0121568 A1* | 5/2013 | Krishnan | G06T 3/4053 382/162 |
| 2015/0264406 A1* | 9/2015 | Kim | H04N 19/182 375/240.29 |
| 2017/0094285 A1* | 3/2017 | Said | H04N 19/105 |
| 2017/0231593 A1* | 8/2017 | Fukuda | A61B 6/032 382/132 |
| 2018/0343469 A1* | 11/2018 | Jin | H04N 19/593 |

* cited by examiner

FIG. 3

| TRANSFORM TYPE | BASIS FUNCTION $T_i(j)$, $i, j = 0, 1, ..., N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$<br>WHERE $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$<br>WHERE $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

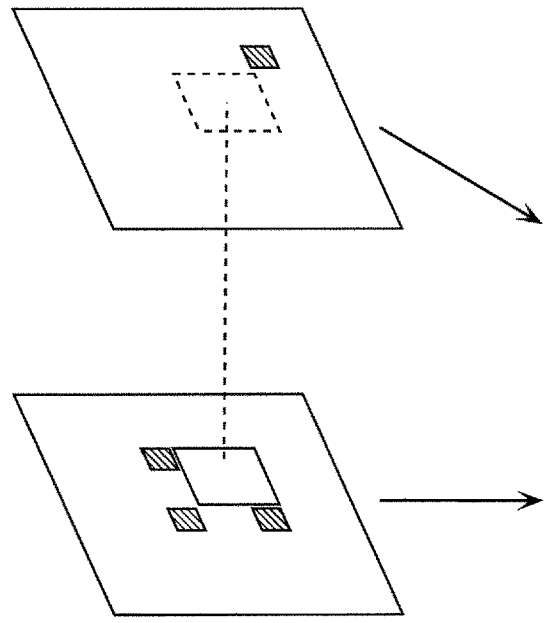

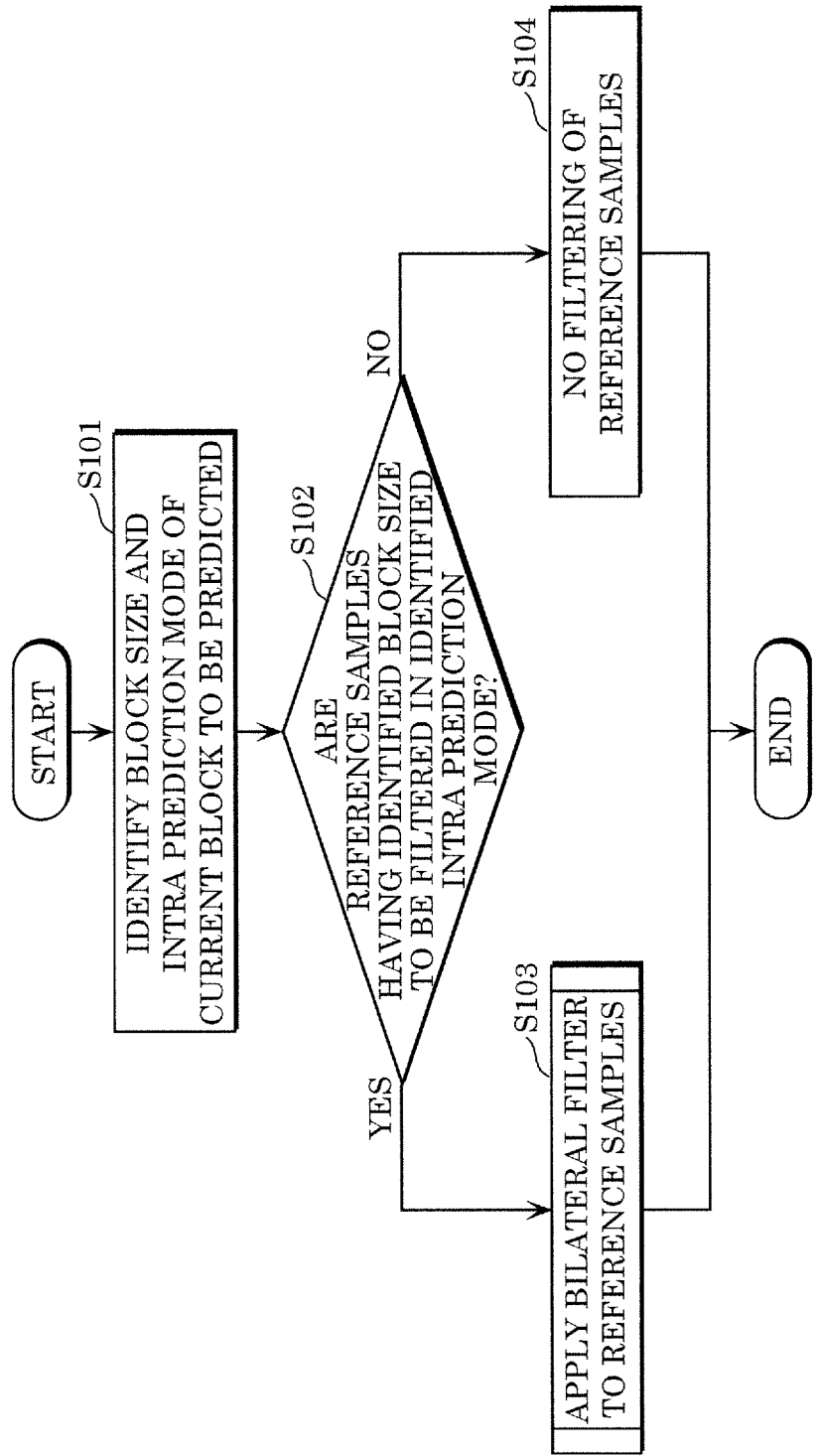

ENCODING DEVICE, DECODING DEVICE, ENCODING METHOD, AND DECODING METHOD

CROSS REFERENCE TO RELATED APPLICATION

The present application claims the benefit of U.S. Provisional Patent Application No. 62/469,638 filed on Mar. 10, 2017. The entire disclosure of the above-identified application, including the specification, drawings and claims is incorporated herein by reference in its entirety.

FIELD

The present disclosure relates to an encoding device, a decoding device, an encoding method, and a decoding method.

BACKGROUND

The video coding standards called High Efficiency Video Coding (HEVC) have been standardized by Joint Collaborative Team on Video Coding (JCT-VC).

CITATION LIST

Non Patent Literature

[Non Patent Literature 1] H.265 (ISO/IEC 23008-2 High Efficiency Video Coding (HEVC))

SUMMARY

Technical Problem

There are demands for further improvement in the coding and decoding techniques.

In view of this, non-limiting and illustrative embodiments have objects to provide an encoding device, a decoding device, an encoding method, and a decoding method which can achieve further improvement in the coding and decoding techniques.

Solution to Problem

An encoding device according to an aspect of the present disclosure includes: processing circuitry; and memory, wherein, by using the memory, the processing circuitry: refers to, as a plurality of reference samples, either a plurality of pixels located on a left of a current block to be predicted or a plurality of pixels located above the current block to be predicted; performs filtering on a pixel value of a current reference sample to be processed included in the plurality of reference samples, using pixel values of the plurality of reference samples; generates a prediction image of the current block to be predicted by performing intra prediction using the pixel value of the current reference sample to be processed, the pixel value having been filtered in the filtering; and calculates a difference between the current block to be predicted and the prediction image, and when performing the filtering, the processing circuitry: determines a weight for each of the plurality of reference samples, based on a distance between the reference sample and the current reference sample to be processed and a difference in pixel value between the reference sample and the current reference sample to be processed; and performs filtering on the pixel value of the current reference sample to be processed by weighted addition using each of the pixel values of the plurality of reference samples and the weight determined for each reference sample.

A decoding device according to an aspect of the present disclosure includes: processing circuitry; and memory, wherein, by using the memory, the processing circuitry: refers to, as a plurality of reference samples, either a plurality of pixels located on a left of an encoded current block to be predicted or a plurality of pixels located above the encoded current block to be predicted; performs filtering on a pixel value of a current reference sample to be processed included in the plurality of reference samples, using pixel values of the plurality of reference samples; generates a prediction image of the current block to be predicted by performing intra prediction using the pixel value of the current reference sample to be processed, the pixel value having been filtered in the filtering; and adds the prediction image to a prediction error obtainable from a bitstream, and when performing the filtering, the processing circuitry: determines a weight for each of the plurality of reference samples, based on a distance between the reference sample and the current reference sample to be processed and a difference in pixel value between the reference sample and the current reference sample to be processed; and performs filtering on the pixel value of the current reference sample to be processed by weighted addition using each of the pixel values of the plurality of reference samples and the weight determined for each reference sample.

It is to be noted that each of the generic or specific aspects may be implemented as a system, a method, an integrated circuit, a computer program, or a recording medium such as a computer-readable CD-ROM, or any combination of a system, a method, an integrated circuit, a computer program, and a storage media.

Further merits and advantages provided by the disclosed embodiments will be apparent from the Specification and the Drawings. The merits and advantages may be individually provided by features disclosed in the Specification and the Drawings or in various kinds of embodiments, and all of the features need not always be provided in order to achieve one or more of the merits and advantages.

Advantageous Effects

The present disclosure describes the encoding device, the decoding device, the encoding method, and the decoding method which achieve further improvement in the coding and decoding techniques.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a chart indicating transform basis functions for each transform type.

FIG. 9B is for illustrating an outline of a process for deriving a motion vector via merge mode.

FIG. 14 is a flowchart indicating a first example of processing operations performed by a bilateral filter of the encoding device according to Embodiment 2.

DESCRIPTION OF EMBODIMENTS

Figure 1:
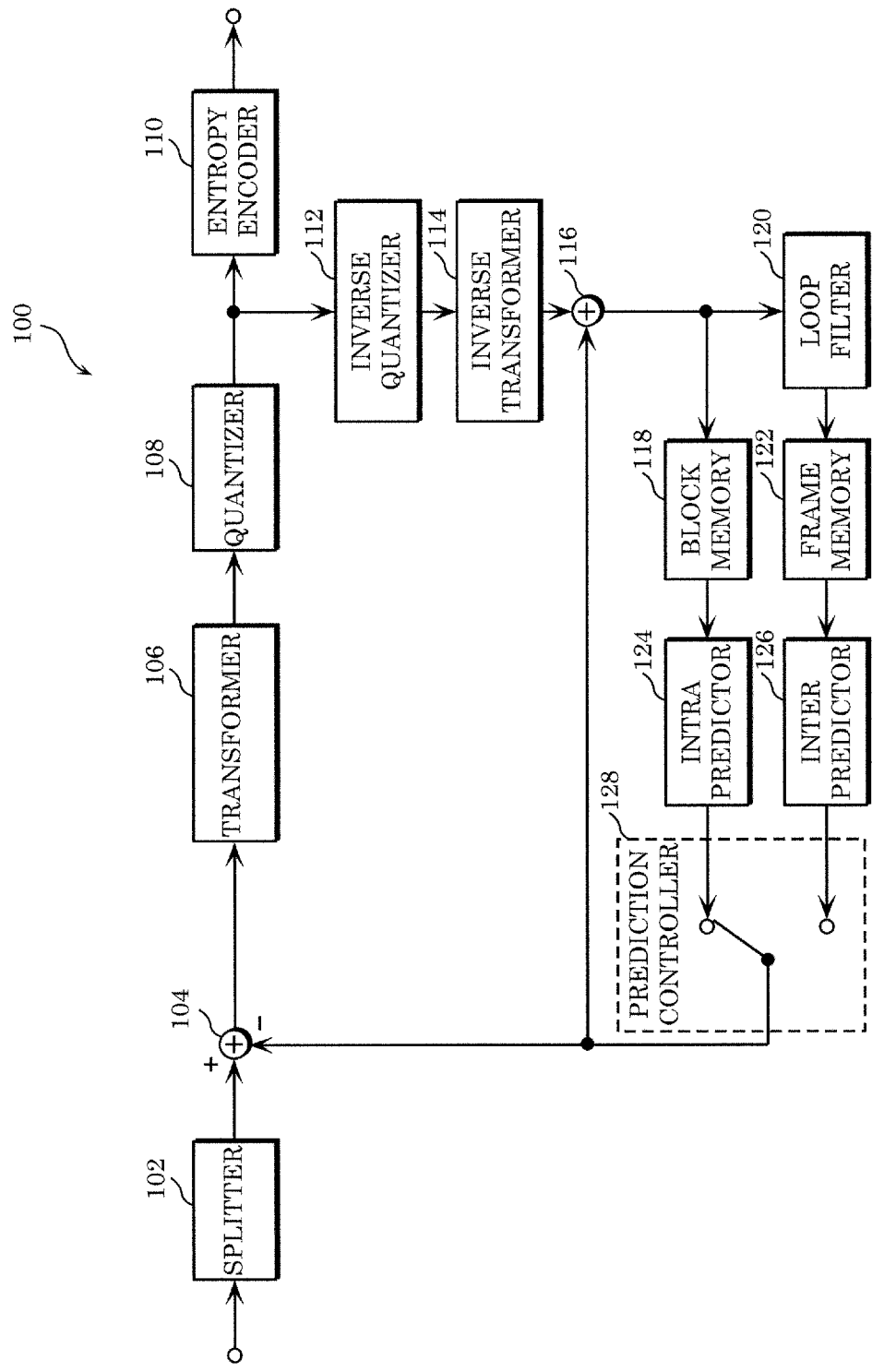
FIG. 1 is a block diagram illustrating a functional configuration of the encoding device according to Embodiment 1.

An encoding device according to an aspect of the present disclosure includes: processing circuitry; and memory, wherein, by using the memory, the processing circuitry: refers to, as a plurality of reference samples, either a plurality of pixels located on a left of a current block to be predicted or a plurality of pixels located above the current block to be predicted; performs filtering on a pixel value of a current reference sample to be processed included in the plurality of reference samples, using pixel values of the plurality of reference samples; generates a prediction image of the current block to be predicted by performing intra prediction using the pixel value of the current reference sample to be processed, the pixel value having been filtered in the filtering; and calculates a difference between the current block to be predicted and the prediction image, and when performing the filtering, the processing circuitry: determines a weight for each of the plurality of reference samples, based on a distance between the reference sample and the current reference sample to be processed and a difference in pixel value between the reference sample and the current reference sample to be processed; and performs filtering on the pixel value of the current reference sample to be processed by weighted addition using each of the pixel values of the plurality of reference samples and the weight determined for each reference sample. For example, the difference in pixel value may be a difference in luminance value.

In this way, the weight for the reference sample is determined based not only on the distance between the reference sample and the current reference sample to be processed but also the difference in pixel value between the reference samples. Accordingly, it is possible to perform smoothing on coded artefacts in the plurality of reference samples while maintaining the edges included in the plurality of reference samples. It is to be noted that the plurality of reference samples belong to the already reconstructed surrounding block located on the left of or above the current block to be predicted.

In addition, when determining the weight for each reference sample, the processing circuitry may determine a smaller weight for the reference sample when the distance is longer.

In this way, only the smaller weight is determined for the reference sample distant from the current reference sample to be processed, and the larger weight is determined for the reference sample close to the current reference sample to be processed. Accordingly, it is possible to perform spatially appropriate filtering on the current reference sample to be processed.

In addition, when determining the weight for each reference sample, the processing circuitry may determine a smaller weight for the reference sample when the difference in pixel value is larger.

In this way, it is possible to appropriately maintain the edges included in the plurality of reference samples.

In addition, when determining the weight for each reference sample, the processing circuitry may determine a smaller weight for the reference sample when a ratio of the distance with respect to a first parameter based on a block size of the current block to be predicted is larger. For example, the first parameter may indicate a larger value when the block size of the current block to be predicted is larger.

In this way, since the ratio of the distance with respect to the first parameter is larger when the block size is smaller, the smaller weight is determined for the reference sample. Accordingly, it is possible to prevent detailed expression of an image represented by the plurality of reference samples from disappearing due to filtering.

In addition, when determining the weight for each reference sample, the processing circuitry may determine a smaller weight for the reference sample when a ratio of the difference in pixel value with respect to a second parameter based on contrast of the plurality of reference samples is larger. For example, the second parameter may indicate a smaller value when the contrast of the plurality of reference samples is lower.

In this way, since the ratio of the difference in pixel value with respect to the second parameter is larger when the contrast is lower, the smaller weight is determined for the reference sample. Accordingly, it is possible to prevent detailed expression of an image represented by the plurality of reference samples from disappearing due to filtering.

In addition, when (i) positions of the current reference sample to be processed and a given one of the reference samples in an orthogonal coordinate system are respectively represented as (i, j) and (k, l), (ii) the pixel value of the current reference sample to be processed and the pixel value of the given one of the reference samples are respectively represented as I (i, j) and I (k, l), and (iii) a first parameter and a second parameter are respectively represented as $\sigma_d$ and $\sigma_y$, the processing circuitry may determine, when determining the weight for each reference sample, the weight of the given one of the reference samples according to an expression below, where the weight is denoted as $\omega$ (i, j, k, l).

[Math. 1]

$$\omega(i, j, k, l) = e^{\left(-\frac{(i-k)^2+(j-l)^2}{2\sigma_d^2} - \frac{\|I(i,j)-I(k,l)\|^2}{2\sigma_y^2}\right)}$$

In this way, it is possible to determine a weight more appropriate for the reference sample.

A decoding device according to an aspect of the present disclosure includes: processing circuitry; and memory, wherein, by using the memory, the processing circuitry: refers to, as a plurality of reference samples, either a plurality of pixels located on a left of an encoded current block to be predicted or a plurality of pixels located above the encoded current block to be predicted; performs filtering on a pixel value of a current reference sample to be processed included in the plurality of reference samples, using pixel values of the plurality of reference samples; generates a prediction image of the current block to be predicted by performing intra prediction using the pixel value of the current reference sample to be processed, the pixel value having been filtered in the filtering; and adds the prediction image to a prediction error obtainable from a bitstream, and when performing the filtering, the processing circuitry: determines a weight for each of the plurality of reference samples, based on a distance between the reference sample and the current reference sample to be processed and a difference in pixel value between the reference sample and the current reference sample to be processed; and performs filtering on the pixel value of the current reference sample to be processed by weighted addition using each of the pixel values of the plurality of reference samples and the weight determined for each reference sample. For example, the difference in pixel value may be a difference in luminance value.

In this way, the weight for the reference sample is determined based not only on the distance between the reference sample and the current reference sample to be processed but also the difference in pixel value between the reference samples. Accordingly, it is possible to perform smoothing of coded artefacts in the plurality of reference samples while maintaining the edges included in the plurality of reference samples.

In addition, when determining the weight for each reference sample, the processing circuitry may determine a smaller weight for the reference sample when the distance is longer.

In this way, only the smaller weight is determined for the reference sample distant from the current reference sample to be processed, and the larger weight is determined for the reference sample close to the current reference sample to be processed. Accordingly, it is possible to perform spatially appropriate filtering on the current reference sample to be processed.

In addition, when determining the weight for each reference sample, the processing circuitry may determine a smaller weight for the reference sample when the difference in pixel value is larger.

In this way, it is possible to appropriately maintain the edges included in the plurality of reference samples.

In addition, when determining the weight for each reference sample, the processing circuitry may determine a smaller weight for the reference sample when a ratio of the distance with respect to a first parameter based on a block size of the current block to be predicted is larger. For example, the first parameter may indicate a larger value when the block size of the current block to be predicted is larger.

In this way, since the ratio of the distance with respect to the first parameter is larger when the block size is smaller, the smaller weight is determined for the reference sample. Accordingly, it is possible to prevent detailed expression of an image represented by the plurality of reference samples from disappearing due to filtering.

In addition, when determining the weight for each reference sample, the processing circuitry may determine a smaller weight for the reference sample when a ratio of the difference in pixel value with respect to a second parameter based on contrast of the plurality of reference samples is larger. For example, the second parameter may indicate a smaller value when the contrast of the plurality of reference samples is lower.

In this way, since the ratio of the difference in pixel value with respect to the second parameter is larger when the contrast is lower, the smaller weight is determined for the reference sample. Accordingly, it is possible to prevent detailed expression of an image represented by the plurality of reference samples from disappearing due to filtering.

In addition, when (i) positions of the current reference sample to be processed and a given one of the reference samples in an orthogonal coordinate system are respectively represented as (i, j) and (k, l), (ii) the pixel value of the current reference sample to be processed and the pixel value of the given one of the reference samples are respectively represented as I (i, j) and I (k, l), and (iii) a first parameter and a second parameter are respectively represented as $\sigma d$ and $\sigma_Y$, the processing circuitry determines, when determining the weight for each reference sample, the weight of the given one of the reference samples according to an expression below, where the weight is denoted as ω (i, j, k, l).

[Math. 2]
$$\omega(i, j, k, l) = e^{\left(-\frac{(i-k)^2+(j-l)^2}{2\sigma_d^2} - \frac{\|I(i,j)-I(k,l)\|^2}{2\sigma_Y^2}\right)}$$

In this way, it is possible to determine a weight more appropriate for the reference sample.

It is to be noted that each of the generic or specific aspects may be implemented as a system, a method, an integrated circuit, a computer program, or a recording medium such as a computer-readable CD-ROM, or any combination of a system, a method, an integrated circuit, a computer program, and a storage media.

Hereinafter, embodiments are described specifically with reference to the drawings.

It is to be noted that each of the embodiments to be described below indicates a generic or specific example. The numerical values, shapes, materials, constituent elements, the arrangement and connection of the constituent elements, steps, the processing order of the steps etc. indicated in the following exemplary embodiments are mere examples, and therefore do not limit the scope of the appended Claims. Therefore, among the constituent elements in the following exemplary embodiments, constituent elements not recited in any one of the independent claims which indicates the most generic concept are described as arbitrary constituent elements.

Embodiment 1

First, an outline of Embodiment 1 will be presented. Embodiment 1 is one example of an encoding device and a decoding device to which the processes and/or configurations presented in subsequent description of aspects of the present disclosure are applicable. Note that Embodiment 1 is merely one example of an encoding device and a decoding device to which the processes and/or configurations presented in the description of aspects of the present disclosure are applicable. The processes and/or configurations presented in the description of aspects of the present disclosure can also be implemented in an encoding device and a decoding device different from those according to Embodiment 1.

When the processes and/or configurations presented in the description of aspects of the present disclosure are applied to Embodiment 1, for example, any of the following may be performed.

(1) regarding the encoding device or the decoding device according to Embodiment 1, among components included in the encoding device or the decoding device according to Embodiment 1, substituting a component corresponding to a component presented in the description of aspects of the present disclosure with a component presented in the description of aspects of the present disclosure;

(2) regarding the encoding device or the decoding device according to Embodiment 1, implementing discretionary changes to functions or implemented processes performed by one or more components included in the encoding device or the decoding device according to Embodiment 1, such as addition, substitution, or removal, etc., of such functions or implemented processes, then substituting a component corresponding to a component presented in the description of aspects of the present disclosure with a component presented in the description of aspects of the present disclosure;

(3) regarding the method implemented by the encoding device or the decoding device according to Embodiment 1, implementing discretionary changes such as addition of processes and/or substitution, removal of one or more of the processes included in the method, and then substituting a processes corresponding to a process presented in the description of aspects of the present disclosure with a process presented in the description of aspects of the present disclosure;

(4) combining one or more components included in the encoding device or the decoding device according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(5) combining a component including one or more functions included in one or more components included in the encoding device or the decoding device according to Embodiment 1, or a component that implements one or more processes implemented by one or more components included in the encoding device or the decoding device according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(6) regarding the method implemented by the encoding device or the decoding device according to Embodiment 1, among processes included in the method, substituting a process corresponding to a process presented in the description of aspects of the present disclosure with a process presented in the description of aspects of the present disclosure; and (7) combining one or more processes included in the method implemented by the encoding device or the decoding device according to Embodiment 1 with a process presented in the description of aspects of the present disclosure.

Note that the implementation of the processes and/or configurations presented in the description of aspects of the present disclosure is not limited to the above examples. For example, the processes and/or configurations presented in the description of aspects of the present disclosure may be implemented in a device used for a purpose different from the moving picture/picture encoding device or the moving picture/picture decoding device disclosed in Embodiment 1. Moreover, the processes and/or configurations presented in the description of aspects of the present disclosure may be independently implemented. Moreover, processes and/or configurations described in different aspects may be combined.

(Encoding Device Outline)

First, the encoding device according to Embodiment 1 will be outlined. FIG. 1 is a block diagram illustrating a functional configuration of encoding device 100 according to Embodiment 1. Encoding device 100 is a moving picture/picture encoding device that encodes a moving picture/picture block by block.

As illustrated in FIG. 1, encoding device 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoding device 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoding device 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoding device 100 will be described.

(Splitter)

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
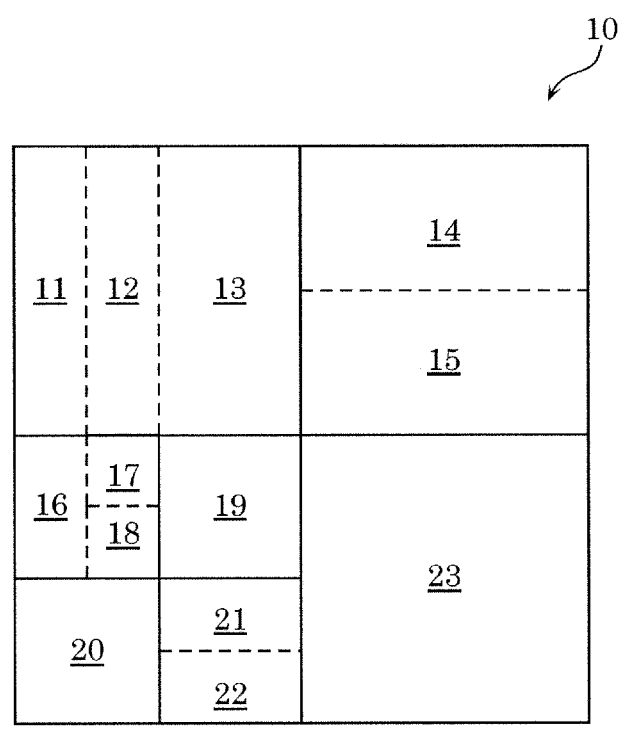
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

(Subtractor)

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoding device 100, and is a signal representing an image for each picture included in a moving picture (for example, a luma signal and two chroma signals). Hereinafter, a signal representing an image is also referred to as a sample.

(Transformer)

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

Here, a separable transform is a method in which a transform is performed a plurality of times by separately performing a transform for each direction according to the number of dimensions input. A non-separable transform is a method of performing a collective transform in which two or more dimensions in a multidimensional input are collectively regarded as a single dimension.

In one example of a non-separable transform, when the input is a 4×4 block, the 4×4 block is regarded as a single array including 16 components, and the transform applies a 16×16 transform matrix to the array.

Moreover, similar to above, after an input 4×4 block is regarded as a single array including 16 components, a transform that performs a plurality of Givens rotations on the array (i.e., a Hypercube-Givens Transform) is also one example of a non-separable transform.

(Quantizer)

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

(Entropy Encoder)

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

(Inverse Quantizer)

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

(Inverse Transformer)

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

(Adder)

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

(Block Memory)

Block memory 118 is storage for storing blocks in a picture to be encoded (hereinafter referred to as a current picture) for reference in intra prediction. More specifically, block memory 118 stores reconstructed blocks output from adder 116.

(Loop Filter)

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, C=5D+A). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
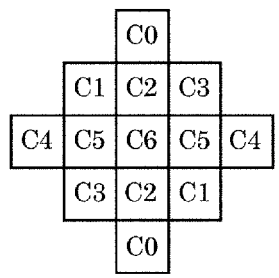
FIG. 4A illustrates one example of a filter shape used in ALF.
Figure 4B:
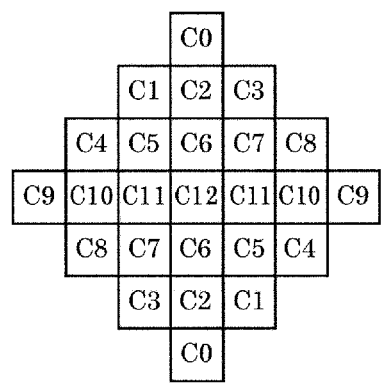
FIG. 4B illustrates another example of a filter shape used in ALF.
Figure 4C:
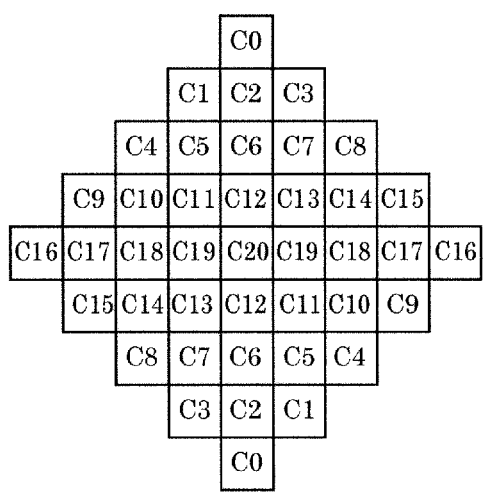
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signalled at the picture level. Note that the signaling of the coefficients set need not be performed at the picture level, and may be performed at another level (for example, at the sequence level, slice level, tile level, CTU level, CU level, or sub-block level).

(Frame Memory)

Frame memory 122 is storage for storing reference pictures used in inter prediction, and is also referred to as a frame buffer. More specifically, frame memory 122 stores reconstructed blocks filtered by loop filter 120.

(Intra Predictor)

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see NPTL 1).

Figure 5A:
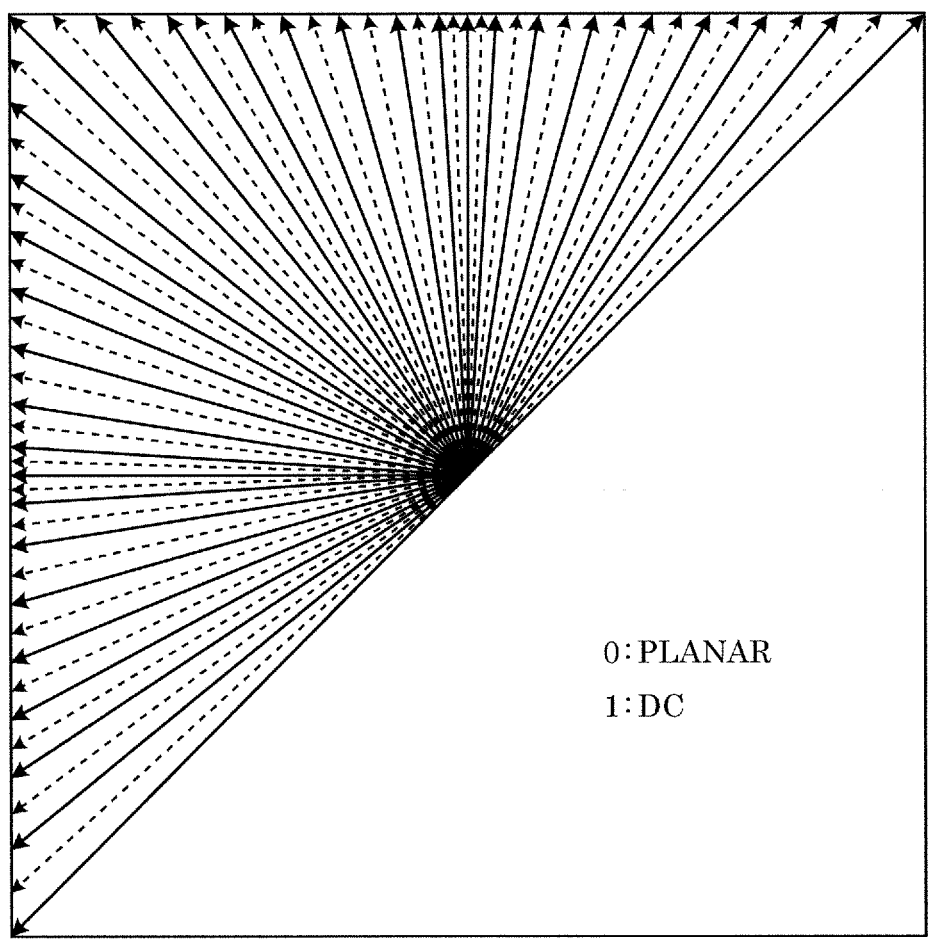
FIG. 5A illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5A illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

(Inter Predictor)

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Figure 5B:
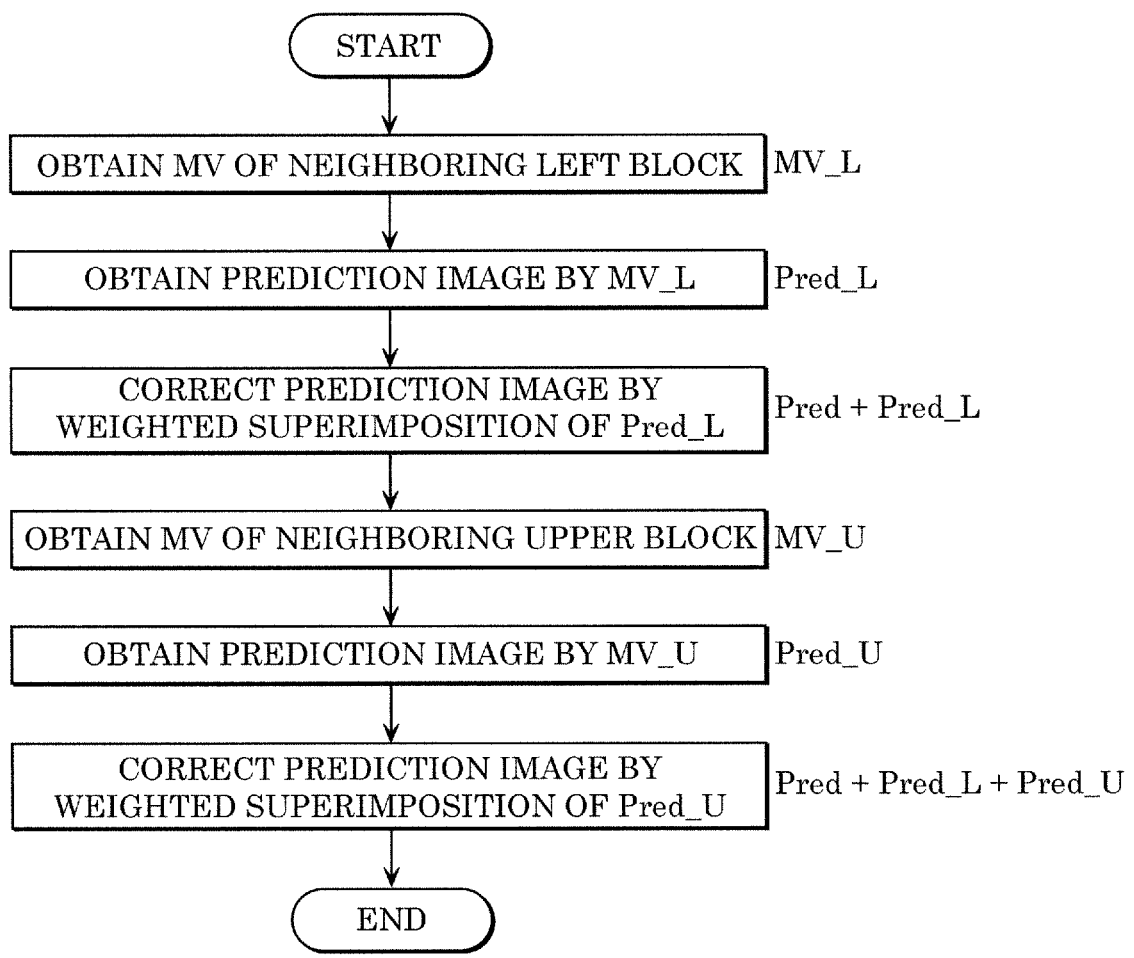
FIG. 5B is a flow chart for illustrating an outline of a prediction image correction process performed via OBMC processing.
Figure 5C:
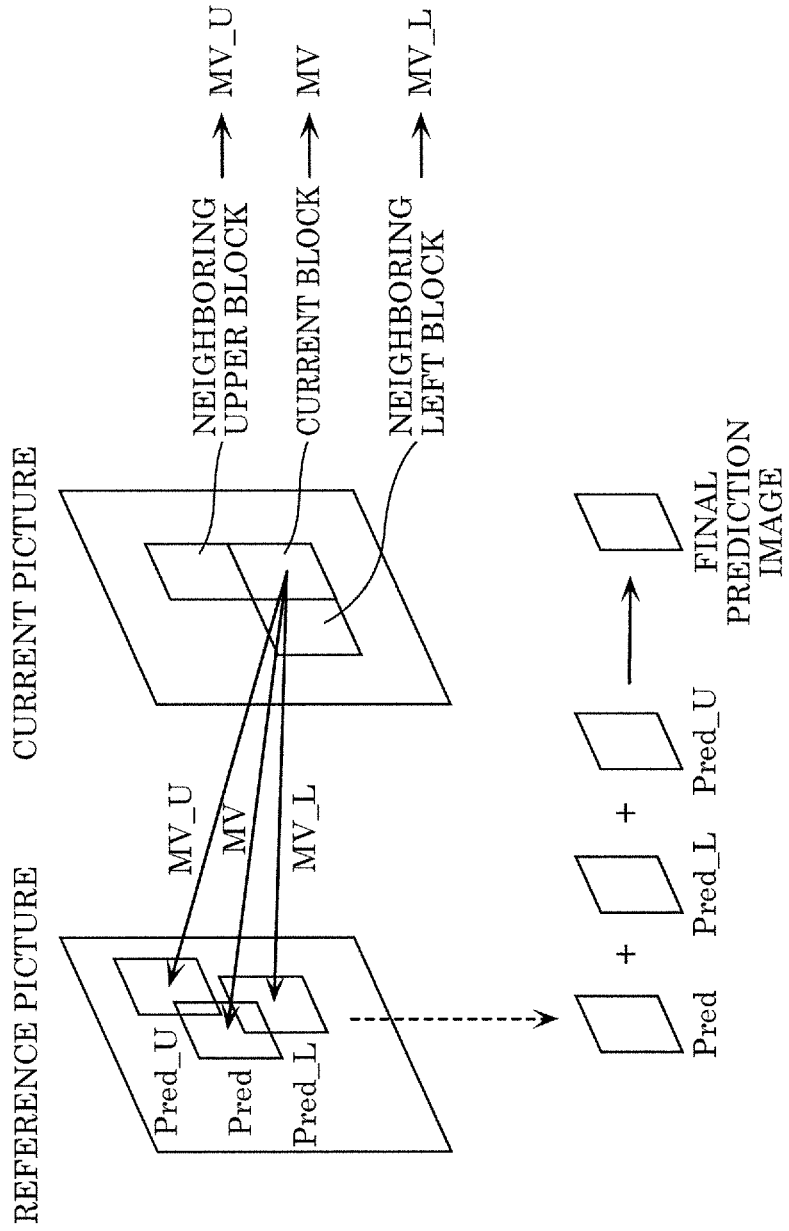
FIG. 5C is a conceptual diagram for illustrating an outline of a prediction image correction process performed via OBMC processing.

Hereinafter, the OBMC mode will be described in further detail. FIG. 5B is a flowchart and FIG. 5C is a conceptual diagram for illustrating an outline of a prediction image correction process performed via OBMC processing.

First, a prediction image (Pred) is obtained through typical motion compensation using a motion vector (MV) assigned to the current block.

Next, a prediction image (Pred_L) is obtained by applying a motion vector (MV_L) of the encoded neighboring left block to the current block, and a first pass of the correction of the prediction image is made by superimposing the prediction image and Pred_L.

Similarly, a prediction image (Pred_U) is obtained by applying a motion vector (MV_U) of the encoded neighboring upper block to the current block, and a second pass of the correction of the prediction image is made by superimposing the prediction image resulting from the first pass and Pred_U. The result of the second pass is the final prediction image.

Note that the above example is of a two-pass correction method using the neighboring left and upper blocks, but the method may be a three-pass or higher correction method that also uses the neighboring right and/or lower block.

Note that the region subject to superimposition may be the entire pixel region of the block, and, alternatively, may be a partial block boundary region.

Note that here, the prediction image correction process is described as being based on a single reference picture, but the same applies when a prediction image is corrected based on a plurality of reference pictures. In such a case, after corrected prediction images resulting from performing correction based on each of the reference pictures are obtained, the obtained corrected prediction images are further superimposed to obtain the final prediction image.

Note that the unit of the current block may be a prediction block and, alternatively, may be a sub-block obtained by further dividing the prediction block.

One example of a method for determining whether to implement OBMC processing is by using an obmc_flag, which is a signal that indicates whether to implement OBMC processing. As one specific example, the encoding device determines whether the current block belongs to a region including complicated motion. The encoding device sets the obmc_flag to a value of "1" when the block belongs to a region including complicated motion and implements OBMC processing when encoding, and sets the obmc_flag to a value of "0" when the block does not belong to a region including complication motion and encodes without implementing OBMC processing. The decoding device switches between implementing OBMC processing or not by decoding the obmc_flag written in the stream and performing the decoding in accordance with the flag value.

Note that the motion information may be derived on the decoding device side without being signalled. For example, a merge mode defined in the H.265/HEVC standard may be used. Moreover, for example, the motion information may be derived by performing motion estimation on the decoding device side. In this case, motion estimation is performed without using the pixel values of the current block.

Here, a mode for performing motion estimation on the decoding device side will be described. A mode for performing motion estimation on the decoding device side is also referred to as pattern matched motion vector derivation (PMMVD) mode or frame rate up-conversion (FRUC) mode.

Figure 5D:
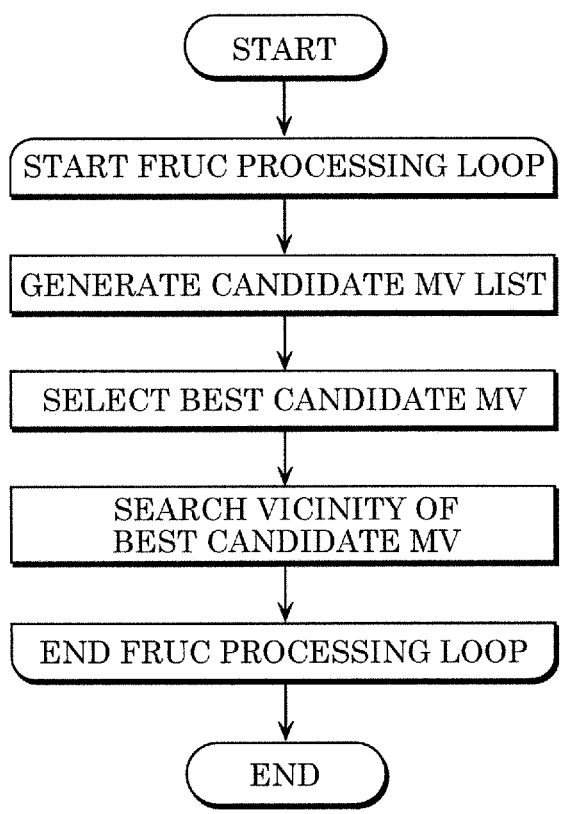
FIG. 5D illustrates one example of FRUC.

One example of FRUC processing is illustrated in FIG. 5D. First, a candidate list (a candidate list may be a merge list) of candidates each including a motion vector predictor is generated with reference to motion vectors of encoded blocks that spatially or temporally neighbor the current block. Next, the best candidate MV is selected from among a plurality of candidate MVs registered in the candidate list. For example, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate (best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched via the same method and an MV having a better evaluation value is found, the best candidate MV may be updated to the MV having the better evaluation value, and the MV having the better evaluation value may be used as the final MV for the current block. Note that a configuration in which this processing is not implemented is also acceptable.

The same processes may be performed in cases in which the processing is performed in units of sub-blocks.

Note that an evaluation value is calculated by calculating the difference in the reconstructed image by pattern matching performed between a region in a reference picture corresponding to a motion vector and a predetermined region. Note that the evaluation value may be calculated by using some other information in addition to the difference.

First, one candidate included in a merge list is selected as the starting point for the search by pattern matching. The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

Figure 6:
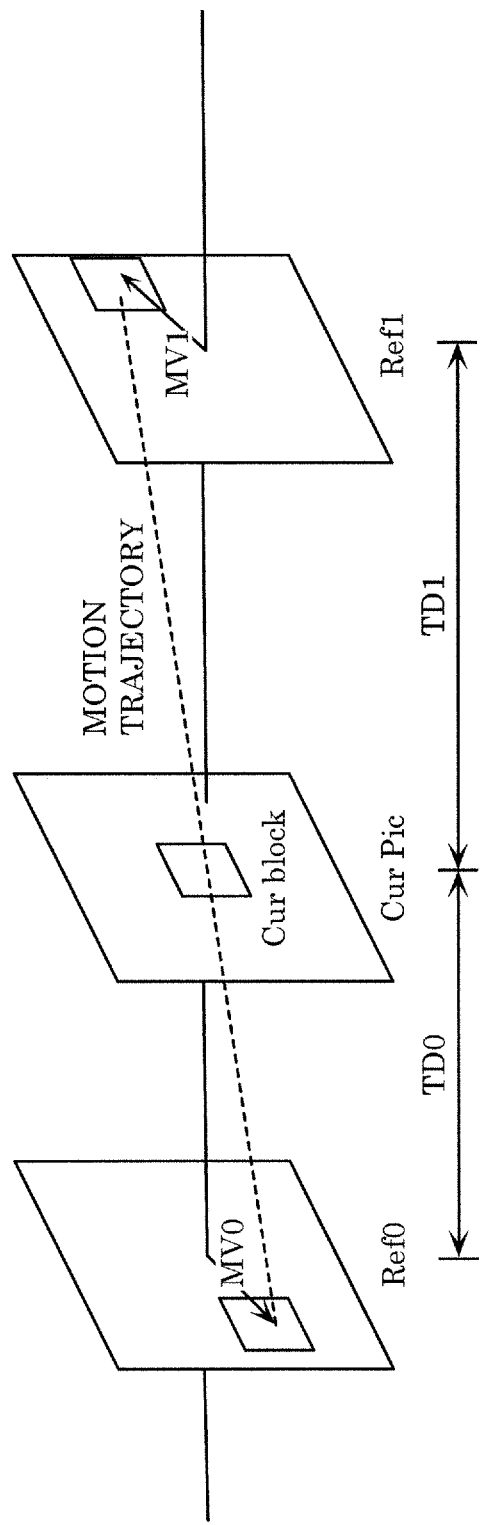
FIG. 6 is for illustrating pattern matching (bilateral matching) between two blocks along a motion trajectory.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1). More specifically, a difference between (i) a reconstructed image in a specified position in a first encoded reference picture (Ref0) specified by a candidate MV and (ii) a reconstructed picture in a specified position in a second encoded reference picture (Ref1) specified by a symmetrical MV scaled at a display time interval of the candidate MV may be derived, and the evaluation value for the current block may be calculated by using the derived difference. The candidate MV having the best evaluation value among the plurality of candidate MVs may be selected as the final MV.

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the predetermined region for the above-described calculation of the candidate evaluation value.

Figure 7:
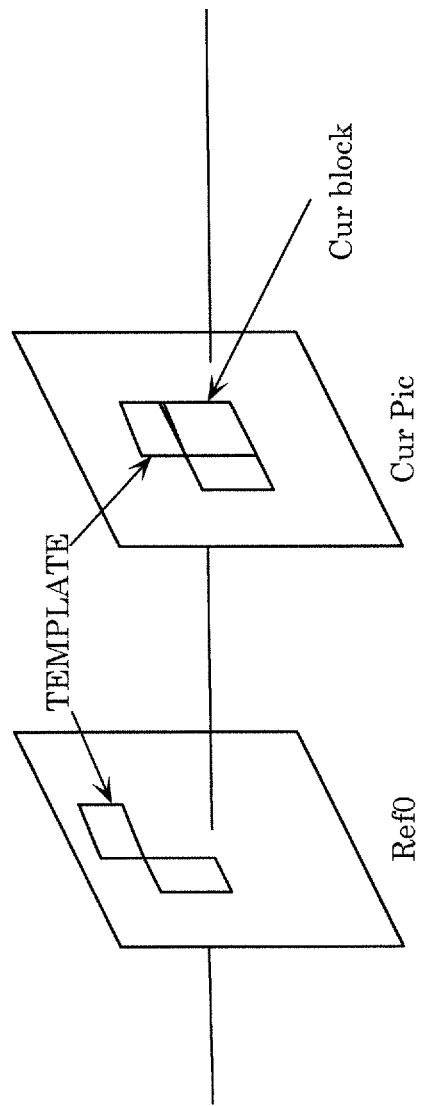
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic). More specifically, a difference between (i) a reconstructed image of an encoded region that is both or one of the neighboring left and neighboring upper region and (ii) a reconstructed picture in the same position in an encoded reference picture (Ref0) specified by a candidate MV may be derived, and the evaluation value for the current block may be calculated by using the derived difference. The candidate MV having the best evaluation value among the plurality of candidate MVs may be selected as the best candidate MV.

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

Here, a mode for deriving a motion vector based on a model assuming uniform linear motion will be described. This mode is also referred to as a bi-directional optical flow (BIO) mode.

Figure 8:
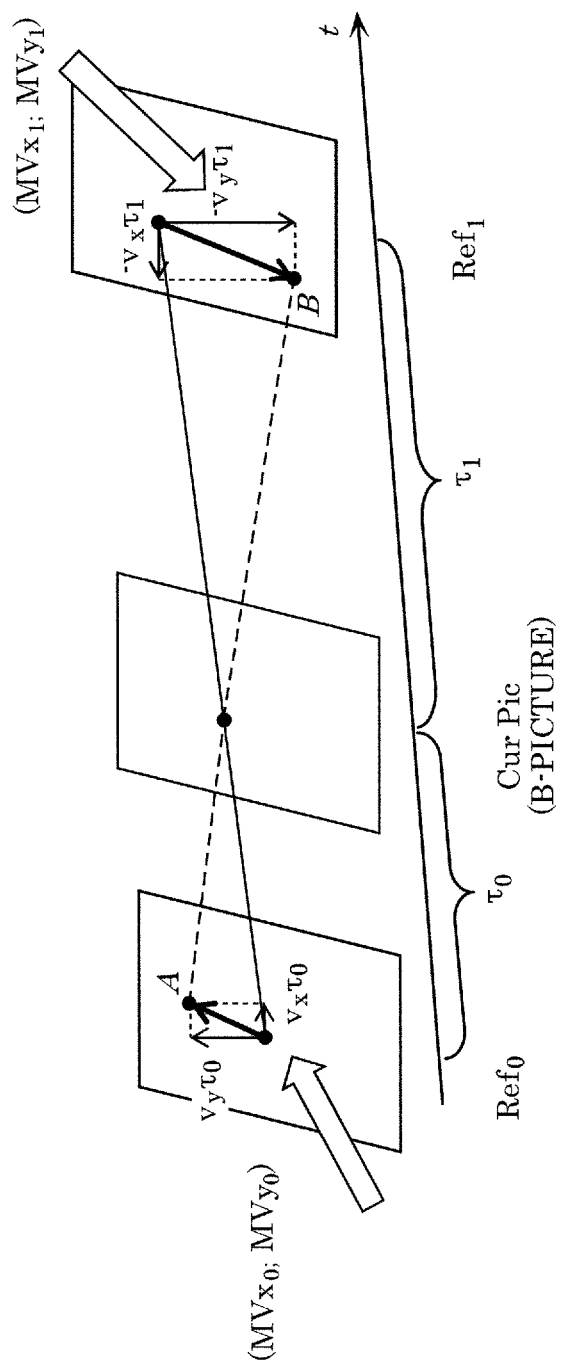
FIG. 8 is for illustrating a model assuming uniform linear motion.

FIG. 8 is for illustrating a model assuming uniform linear motion. In FIG. 8, $(v_x, v_y)$ denotes a velocity vector, and $\tau 0$ and $\tau 1$ denote temporal distances between the current picture (Cur Pic) and two reference pictures (Ref$_0$, Ref$_1$). $(MV_{x0}, MV_{y0})$ denotes a motion vector corresponding to reference picture Ref0, and $(MV_{x1}, MV_{y1})$ denotes a motion vector corresponding to reference picture Ref1.

Here, under the assumption of uniform linear motion exhibited by velocity vector $(v_x, v_y)$, $(MVx_0, MVy_0)$ and $(MVx_1, MVy_1)$ are represented as $(v_x\tau_0, v_y\tau_0)$ and $(-v_x\tau_1, -v_y\tau_1)$, respectively, and the following optical flow equation is given.

Math. 3

$$\partial I^{(k)}/\partial t + v_x \partial I^{(k)}/\partial x + v_y \partial I^{(k)}/\partial y = 0. \quad (1)$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoding device side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9A:
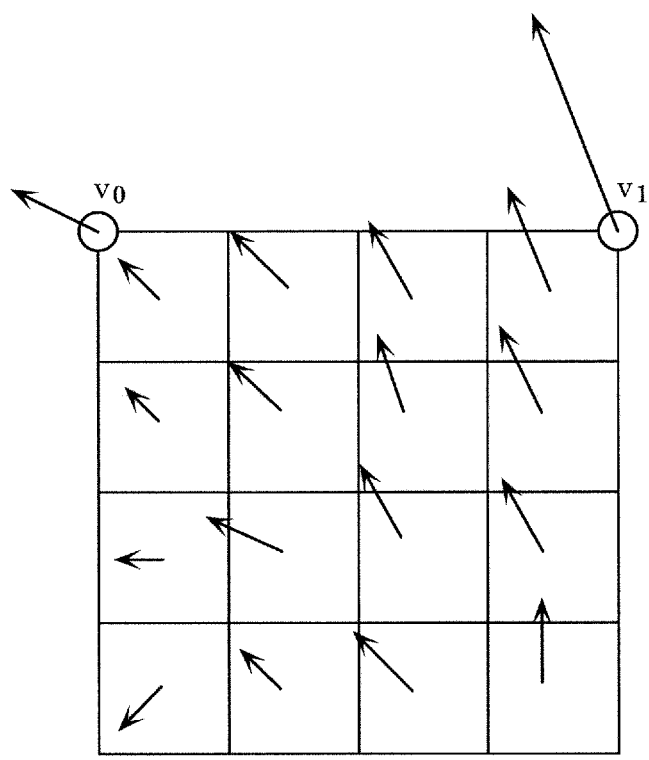
FIG. 9A is for illustrating deriving a motion vector of each sub-block based on motion vectors of neighboring blocks.

FIG. 9A is for illustrating deriving a motion vector of each sub-block based on motion vectors of neighboring blocks. In FIG. 9A, the current block includes 16 4×4 sub-blocks. Here, motion vector v0 of the top left corner control point in the current block is derived based on motion vectors of neighboring sub-blocks, and motion vector v1 of the top right corner control point in the current block is derived based on motion vectors of neighboring blocks. Then, using the two motion vectors v0 and v1, the motion vector $(v_x, v_y)$ of each sub-block in the current block is derived using Equation 2 below.

Math. 4

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).

(Prediction Controller)

Prediction controller 128 selects either the intra prediction signal or the inter prediction signal, and outputs the selected prediction signal to subtractor 104 and adder 116.

Here, an example of deriving a motion vector via merge mode in a current picture will be given. FIG. 9B is for illustrating an outline of a process for deriving a motion vector via merge mode.

First, an MV predictor list in which candidate MV predictors are registered is generated. Examples of candidate MV predictors include: a spatially neighboring MV predictors, which are MVs of encoded blocks positioned in the spatial vicinity of the current block; a temporally neighboring MV predictor, which is an MV of a block in an encoded reference picture that neighbors a block in the same location as the current block; a combined MV predictor, which is an MV generated by combining the MV values of the spatially neighboring MV predictor and the temporally neighboring MV predictor; and a zero MV predictor, which is an MV whose value is zero.

Next, the MV of the current block is determined by selecting one MV predictor from among the plurality of MV predictors registered in the MV predictor list.

Furthermore, in the variable-length encoding device, a merge_idx, which is a signal indicating which MV predictor is selected, is written and encoded into the stream.

Note that the MV predictors registered in the MV predictor list illustrated in FIG. 9B constitute one example. The number of MV predictors registered in the MV predictor list may be different from the number illustrated in FIG. 9B, the MV predictors registered in the MV predictor list may omit one or more of the types of MV predictors given in the example in FIG. 9B, and the MV predictors registered in the MV predictor list may include one or more types of MV predictors in addition to and different from the types given in the example in FIG. 9B.

Note that the final MV may be determined by performing DMVR processing (to be described later) by using the MV of the current block derived via merge mode.

Here, an example of determining an MV by using DMVR processing will be given.

Figure 9C:
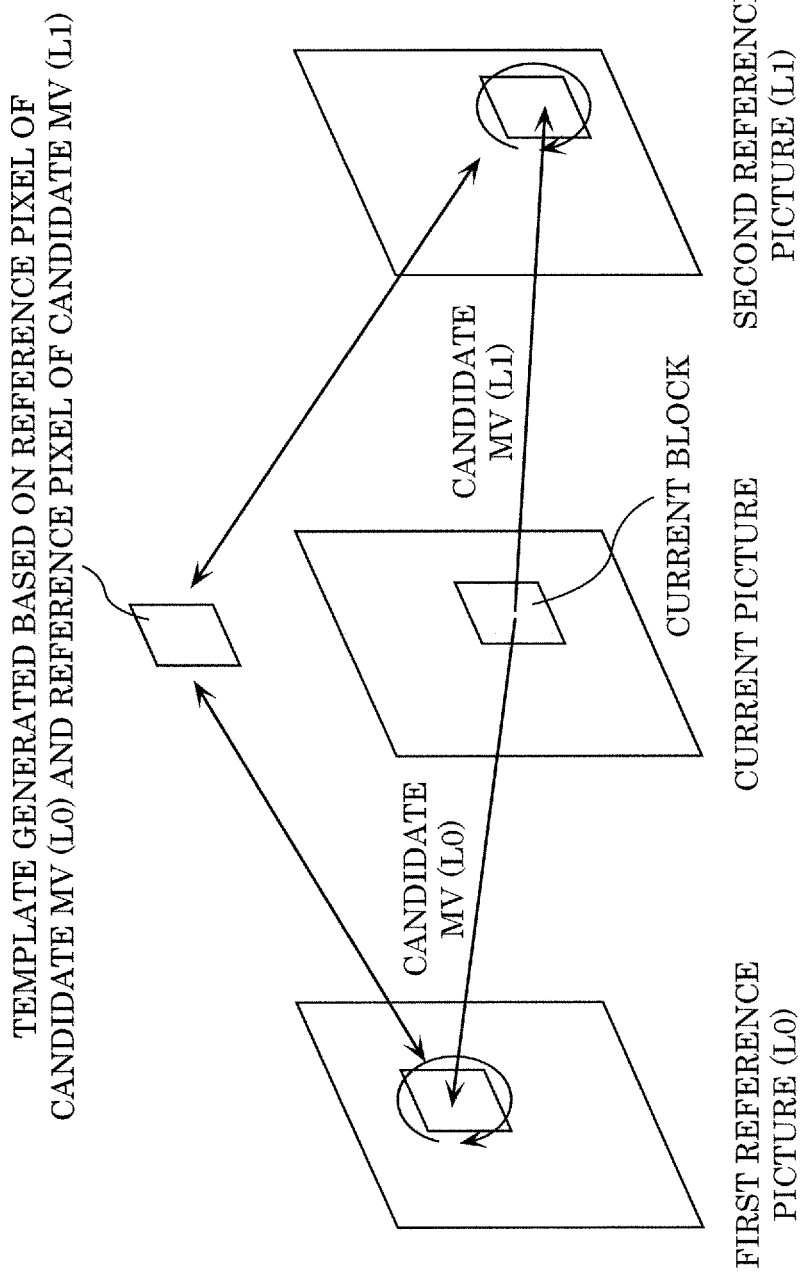
FIG. 9C is a conceptual diagram for illustrating an outline of DMVR processing.

FIG. 9C is a conceptual diagram for illustrating an outline of DMVR processing.

First, the most appropriate MVP set for the current block is considered to be the candidate MV, reference pixels are obtained from a first reference picture, which is a picture processed in the L0 direction in accordance with the candidate MV, and a second reference picture, which is a picture processed in the L1 direction in accordance with the candidate MV, and a template is generated by calculating the average of the reference pixels.

Next, using the template, the surrounding regions of the candidate MVs of the first and second reference pictures are searched, and the MV with the lowest cost is determined to be the final MV. Note that the cost value is calculated using, for example, the difference between each pixel value in the template and each pixel value in the regions searched, as well as the MV value.

Note that the outlines of the processes described here are fundamentally the same in both the encoding device and the decoding device.

Note that processing other than the processing exactly as described above may be used, so long as the processing is capable of deriving the final MV by searching the surroundings of the candidate MV.

Here, an example of a mode that generates a prediction image by using LIC processing will be given.

Figure 9D:
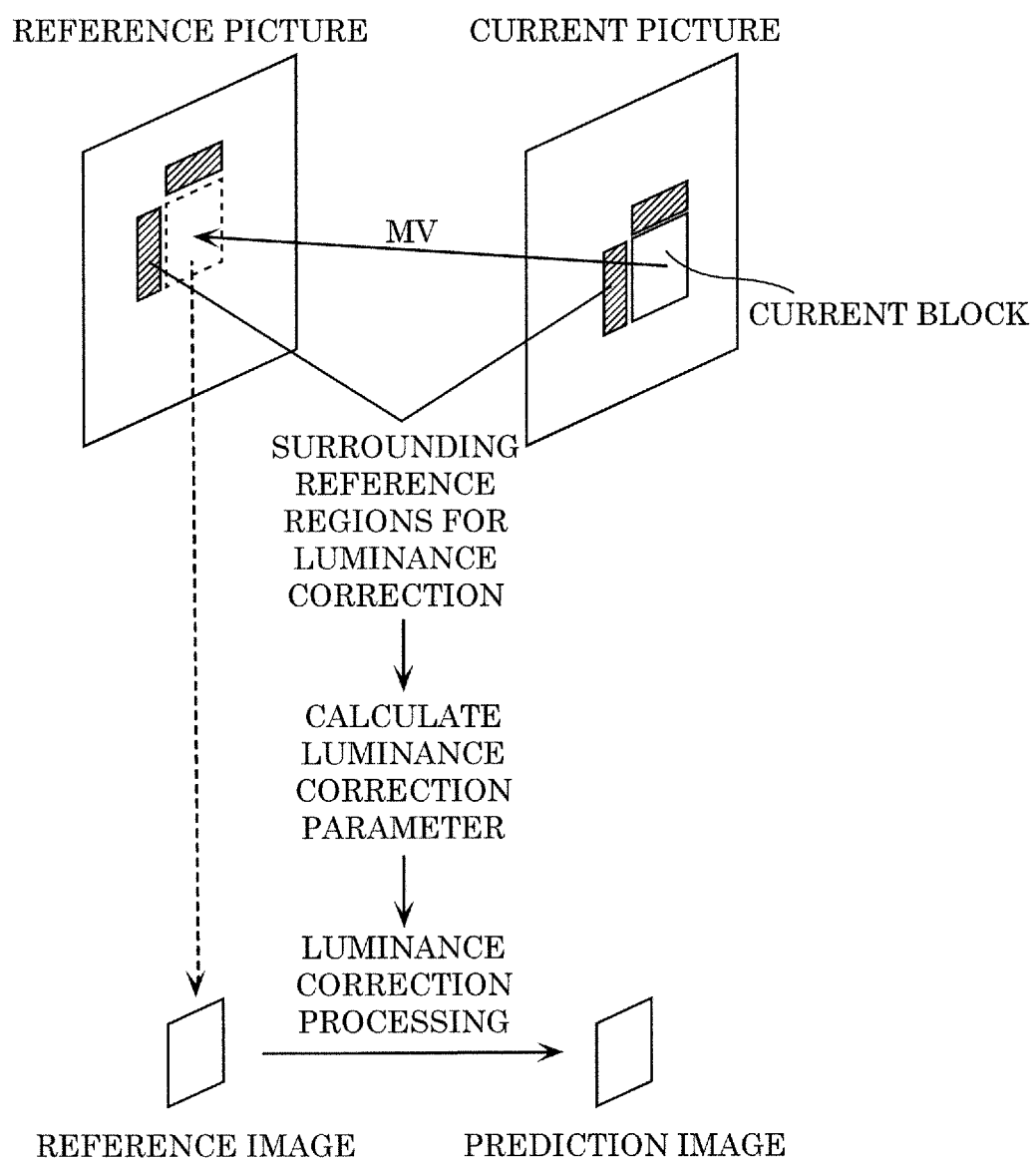
FIG. 9D is for illustrating an outline of a prediction image generation method using a luminance correction process performed via LIC processing.

FIG. 9D is for illustrating an outline of a prediction image generation method using a luminance correction process performed via LIC processing.

First, an MV is extracted for obtaining, from an encoded reference picture, a reference image corresponding to the current block.

Next, information indicating how the luminance value changed between the reference picture and the current picture is extracted and a luminance correction parameter is calculated by using the luminance pixel values for the encoded left neighboring reference region and the encoded upper neighboring reference region, and the luminance pixel value in the same location in the reference picture specified by the MV.

The prediction image for the current block is generated by performing a luminance correction process by using the luminance correction parameter on the reference image in the reference picture specified by the MV.

Note that the shape of the surrounding reference region illustrated in FIG. 9D is just one example; the surrounding reference region may have a different shape.

Moreover, although a prediction image is generated from a single reference picture in this example, in cases in which a prediction image is generated from a plurality of reference pictures as well, the prediction image is generated after performing a luminance correction process, via the same method, on the reference images obtained from the reference pictures.

One example of a method for determining whether to implement LIC processing is by using an lic_flag, which is a signal that indicates whether to implement LIC processing. As one specific example, the encoding device determines whether the current block belongs to a region of luminance change. The encoding device sets the lic_flag to a value of "1" when the block belongs to a region of luminance change and implements LIC processing when encoding, and sets the lic_flag to a value of "0" when the block does not belong to a region of luminance change and encodes without implementing LIC processing. The decoding device switches between implementing LIC processing or not by decoding the lic_flag written in the stream and performing the decoding in accordance with the flag value.

One example of a different method of determining whether to implement LIC processing is determining so in accordance with whether LIC processing was determined to be implemented for a surrounding block. In one specific example, when merge mode is used on the current block, whether LIC processing was applied in the encoding of the surrounding encoded block selected upon deriving the MV in the merge mode processing may be determined, and whether to implement LIC processing or not can be switched based on the result of the determination. Note that in this example, the same applies to the processing performed on the decoding device side.

(Decoding Device Outline)

Figure 10:
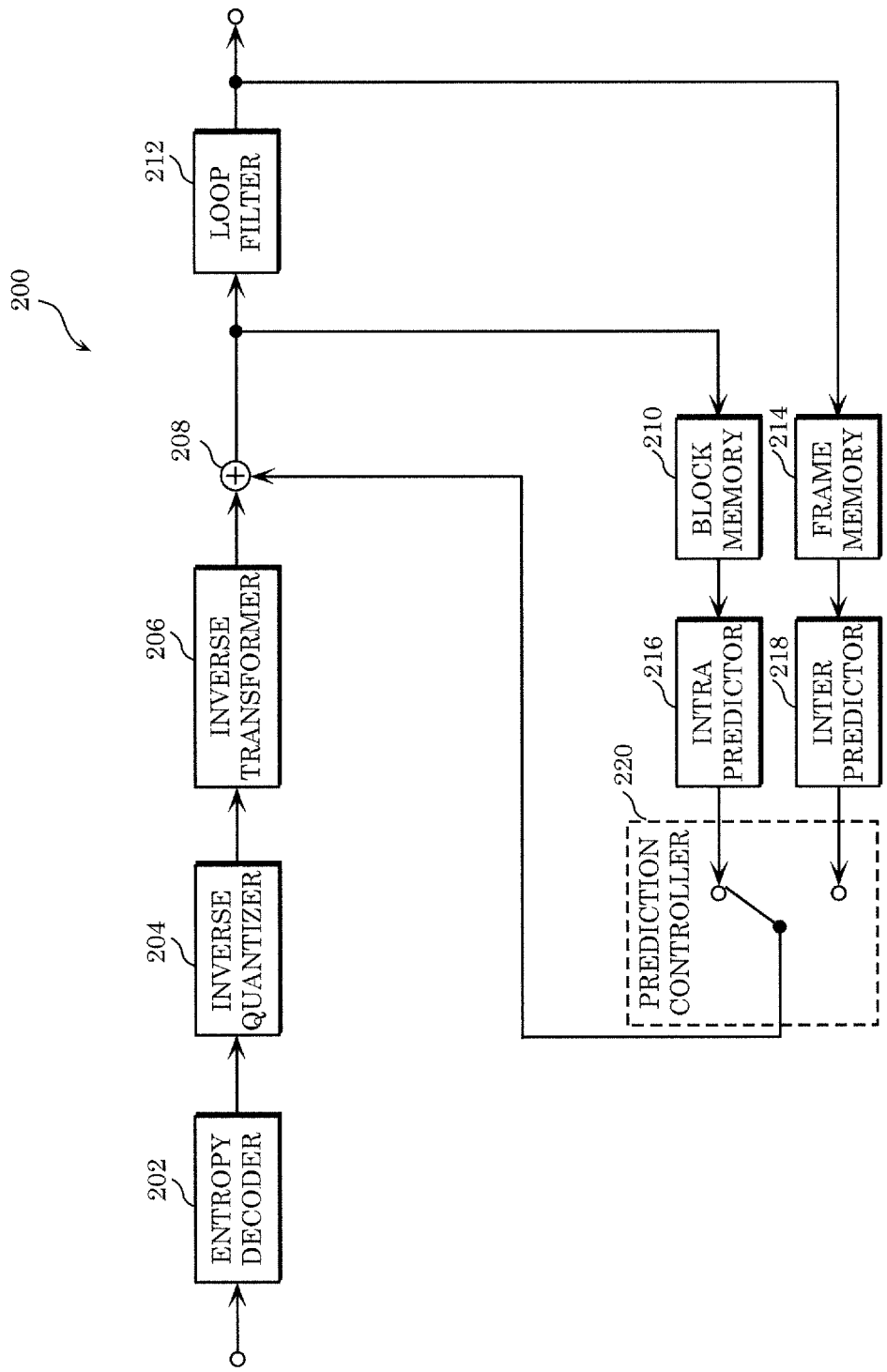
FIG. 10 is a block diagram illustrating a functional configuration of the decoding device according to Embodiment 1.

Next, a decoding device capable of decoding an encoded signal (encoded bitstream) output from encoding device 100 will be described. FIG. 10 is a block diagram illustrating a functional configuration of decoding device 200 according to Embodiment 1. Decoding device 200 is a moving picture/picture decoding device that decodes a moving picture/picture block by block.

As illustrated in FIG. 10, decoding device 200 includes entropy decoder 202, inverse quantizer 204, inverse transformer 206, adder 208, block memory 210, loop filter 212, frame memory 214, intra predictor 216, inter predictor 218, and prediction controller 220.

Decoding device 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoding device 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoding device 200 will be described.

(Entropy Decoder)

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.
(Inverse Quantizer)

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.
(Inverse Transformer)

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.
(Adder)

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.
(Block Memory)

Block memory 210 is storage for storing blocks in a picture to be decoded (hereinafter referred to as a current picture) for reference in intra prediction. More specifically, block memory 210 stores reconstructed blocks output from adder 208.
(Loop Filter)

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.
(Frame Memory)

Frame memory 214 is storage for storing reference pictures used in inter prediction, and is also referred to as a frame buffer. More specifically, frame memory 214 stores reconstructed blocks filtered by loop filter 212.
(Intra Predictor)

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.
(Inter Predictor)

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.
(Prediction Controller)

Prediction controller 220 selects either the intra prediction signal or the inter prediction signal, and outputs the selected prediction signal to adder 208.

Embodiment 2

An encoding device and a decoding device according to this embodiment performs filtering on a reference sample in advance when performing intra prediction. The reference sample is a pixel that is located around a current block to be predicted and is to be used for the intra prediction. It is to be noted that the encoding device according to this embodiment may include all or only some of constituent elements and functions of encoding device 100 according to Embodiment 1. Likewise, the decoding device according to this embodiment may include all or only some of constituent elements and functions of decoding device 200 according to Embodiment 1.

Figure 11:
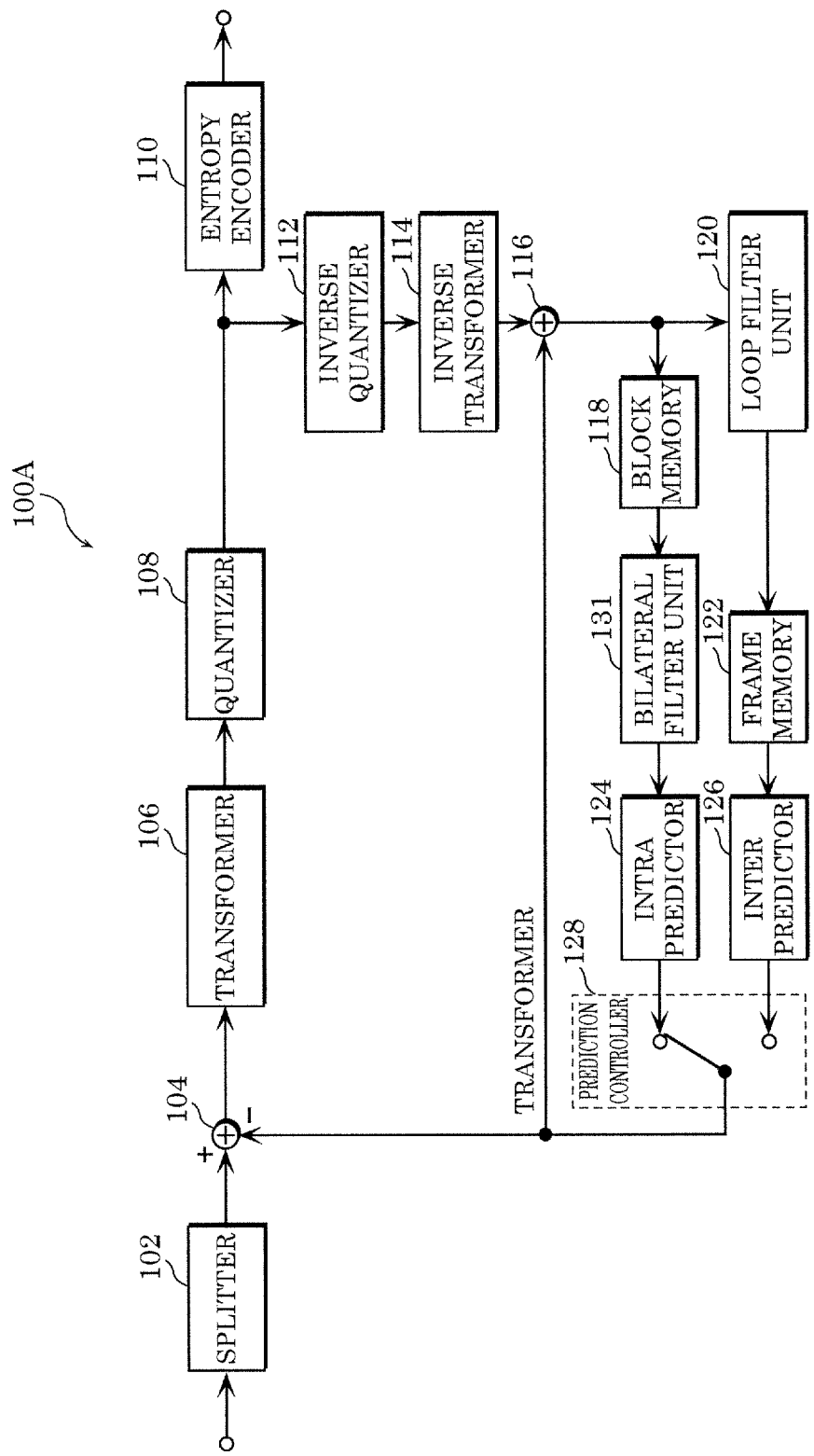
FIG. 11 is a block diagram illustrating a functional configuration of an encoding device according to Embodiment 2.

FIG. 11 is a block diagram illustrating a functional configuration of the encoding device according to this embodiment.

Encoding device 100A according to this embodiment may include, for example, the same constituent elements as in encoding device 100 according to Embodiment 1, and further include bilateral filter unit 131.

Bilateral filter unit 131 refers to, as a reference sample, each of the plurality of pixels arranged on the left of or above the current block to be predicted. Bilateral filter unit 131 performs filtering on the pixel value of the current reference sample to be processed included in the reference samples, using the pixel value of each of the reference samples. It is to be noted that the current block to be predicted is a block to be intra predicted by intra predictor 124.

Figure 12:
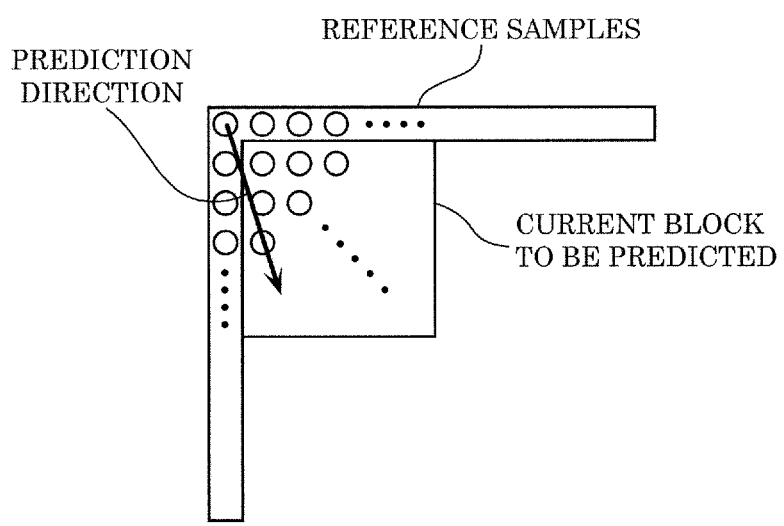
FIG. 12 is a diagram illustrating a current block to be predicted and reference samples according to Embodiment 2.

FIG. 12 is a diagram illustrating a current block to be predicted and reference samples according to Embodiment 2.

Prior to the intra prediction performed by intra predictor 124, bilateral filter unit 131 performs in advance filtering on the reference sample to be used for the intra prediction. In other words, smoothing is performed on the reference sample. A reference sample which is subjected to filtering or smoothing is referred to as a current reference sample to be processed. A plurality of reference samples including the current reference sample to be processed are used for the smoothing. The plurality of reference samples are pixels included in an already reconstructed block (also referred to as a surrounding block) located on the left of or above the current block to be predicted. For example, the plurality of reference samples are arranged on the right of or above the current block to be predicted in a column or a row, and the current reference sample to be processed is disposed at the center of the plurality of reference samples.

Here, smoothing on the reference sample (specifically, the current reference sample to be processed) can reduce coding artefacts but may delete edges useful for the prediction. In other words, in some cases, it is better not to apply strong smoothing on a block having strong edges.

For this reason, bilateral filter unit 131 according to this embodiment performs filtering on the reference sample using a bilateral filter. In other words, bilateral filter unit 131 refers to, as a reference sample, each of the plurality of pixels arranged on the left of or above the current block to be predicted. Bilateral filter unit 131 performs filtering on the pixel value of the current reference sample to be processed included in the reference samples, using the pixel value of each of the reference samples. In this way, intra predictor 124 generates a prediction image for the current block to be predicted by performing intra prediction using the pixel value of the filtered current reference sample to be processed. It is to be noted that the prediction image corresponds to the above-described prediction signal. Subtractor 104 calculates a difference between the current block to be predicted and a prediction image.

In the above-described filtering, bilateral filter unit 131 determines, for each of the plurality of reference samples, the weight of the reference sample based on the distance between the reference sample and the current reference sample to be processed, and the difference in pixel value between the reference sample and the current reference sample to be processed. Bilateral filter unit 131 performs filtering on the pixel value of the current reference sample to be processed, by performing weighted addition using the pixel value of each of the plurality of reference samples and the determined weight. In addition, the difference in the pixel value between the reference sample and the current reference sample to be processed is, for example, a difference in luminance value between the same. In this way, bilateral filter unit 131 performs filtering by a bilateral filter using the distance between the reference sample and the current reference sample to be processed and the difference in pixel value between the same.

It is to be noted that the current reference sample to be processed is a pixel which is subjected to filtering as described above, and the plurality of reference samples are pixels to be used for the filtering of the current reference sample to be processed. The plurality of reference samples include the current reference sample to be processed. For example, the current reference sample to be processed is a central reference sample among N (N is a positive odd number) reference samples arranged in a column on the left of the current block to be predicted. Alternatively, the current reference sample to be processed is, for example, a central reference sample among N reference samples arranged in a row above the current block to be predicted. Here, the weight is a filter coefficient.

By performing filtering using a bilateral filter in this way, encoding device 100A according to this embodiment is capable of performing smoothing on coding artefacts while maintaining edges useful for prediction. More specifically, encoding device 100A is capable of performing smoothing on coding artefacts included in a plurality of reference samples inside a reconstructed surrounding block while maintaining the edges required for the prediction in the reconstructed neighboring block. As a result, encoding device 100A is capable of generating a prediction image whose coding artefacts have been reduced and which reflects the edges of the surrounding block.

It is to be noted that the bilateral filter is applied to the reference sample prior to the intra prediction, instead of a fixed smoothing filter. The bilateral filtering is performed on the reference sample for intra prediction. Accordingly, the reference sample on which bilateral filtering has been performed may not be included in a final decoded image.

In addition, bilateral filter unit 131 may output a filtering flag indicating whether or not to perform filtering on the reference sample to entropy encoder 110. In this way, entropy encoder 110 includes the flag in the bitstream (the above-described coded stream). As a result, the bitstream including the flag is transmitted to the decoding device. In short, the flag is transmitted to the decoding device. Here, entropy encoder 110 may hide the flag when the flag is included in the bitstream. For example, entropy encoder 110 adds 1 to or subtracts 1 from a transform coefficient or a quantization coefficient of a high frequency component among a plurality of coefficients (transform coefficients or quantization coefficients) included in a block according to the value of the flag. In this way, the total sum of all of the coefficients inside the block is set to an odd or even number according to the value (0 or 1) of the flag. Specifically, for example, the total sum is set to an odd number when the flag indicates that filtering is to be performed, and the total sum is set to an even number when the flag indicates that no filtering is to be performed. In this way, the flag is hidden without being explicitly included in the bitstream. It is to be noted that the above-described block whose flag is hidden may be a current block to be predicted or a block (that is, a surrounding block) to which the reference sample belongs.

In addition, bilateral filter unit 131 may determine whether or not filtering is to be performed on the reference sample, based on a block size of the current block to be predicted and an intra prediction mode.

Figure 13:
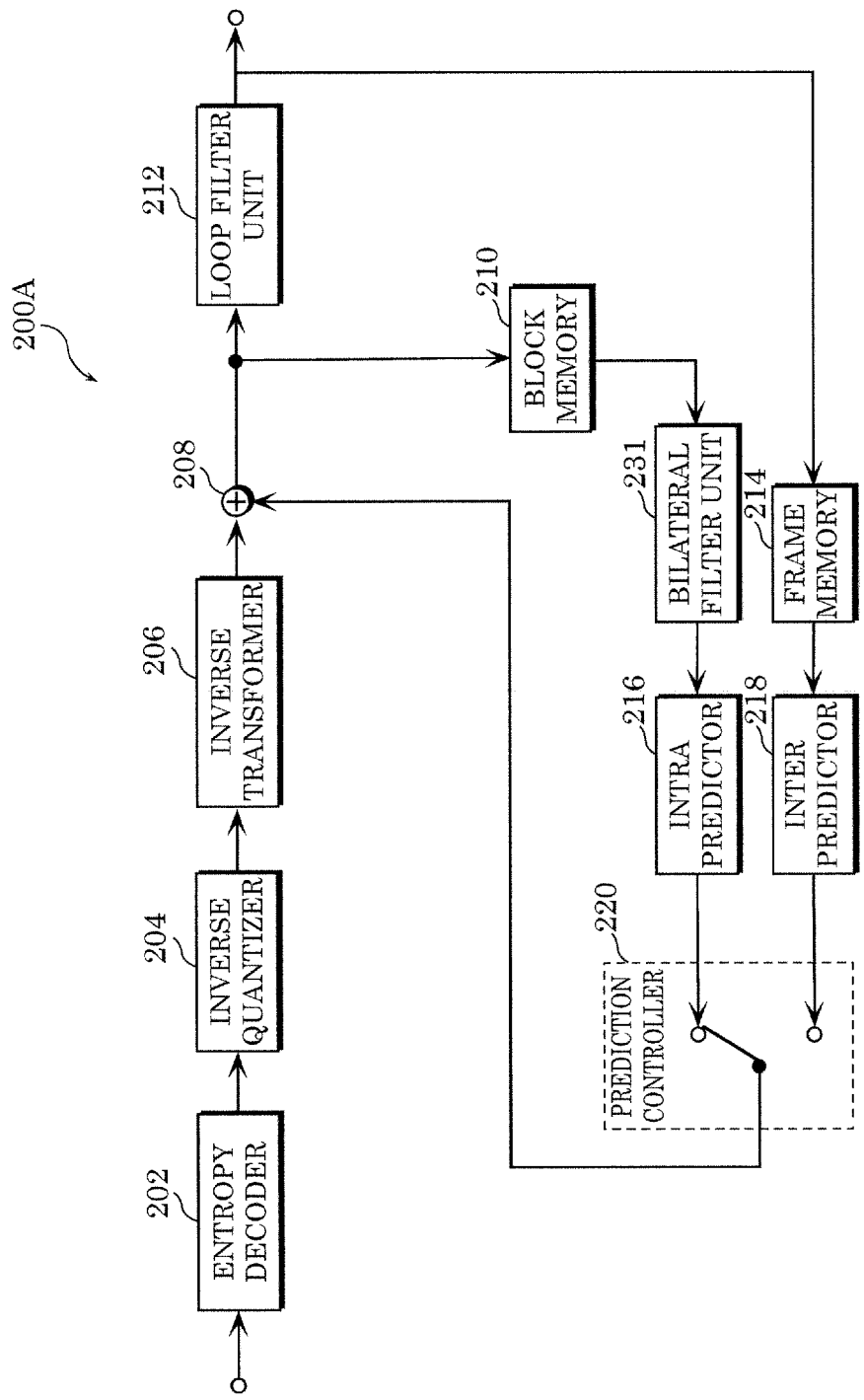
FIG. 13 is a block diagram illustrating a functional configuration of a decoding device according to Embodiment 2.

FIG. 13 is a block diagram illustrating a functional configuration of the decoding device according to this embodiment.

Decoding device 200A according to this embodiment includes, for example, the same constituent elements as in decoding device 200 according to Embodiment 1, and further includes bilateral filter unit 231.

Bilateral filter unit 231 in decoding device 200A applies a bilateral filter to a reference sample in the same manner as bilateral filter unit 131 in encoding device 100A.

In other words, bilateral filter unit 231 refers to, as the reference sample, each of the plurality of pixels arranged on the left of or above an encoded current block to be predicted. Bilateral filter unit 231 performs filtering on the pixel value of the current reference sample to be processed included in the reference samples, using the pixel value of each of the reference samples. In this way, intra predictor 216 generates a prediction image for the current block to be predicted by performing intra prediction using the pixel value of the filtered current reference sample to be processed. Adder 208 adds the prediction image to a prediction error obtainable from the bitstream.

In the above filtering, bilateral filter unit 231 determines, for each of the plurality of reference samples, the weight of the reference sample, using the distance between the reference sample and the current reference sample to be processed and the difference in pixel value between the same. Bilateral filter unit 231 performs filtering on the pixel value of the current reference sample to be processed, by performing weighted addition using the pixel value of each of the plurality of reference samples and the determined weight. In addition, the difference in pixel value is, for example, a difference in luminance value. In this way, bilateral filter unit 231 performs filtering by a bilateral filter using the distance between the reference sample and the current reference sample to be processed and the difference in pixel value between the same.

By performing filtering by the bilateral filter in this way, encoding device 200A according to this embodiment is capable of performing smoothing on coding artefacts while maintaining edges required and useful for prediction. More specifically, decoding device 200A is capable of performing smoothing on coding artefacts included in a plurality of reference samples inside a reconstructed surrounding block while maintaining the edges required for the prediction in the reconstructed neighboring block.

In addition, bilateral filter unit 231 may read out, from the bitstream, a filtering flag indicating whether or not to perform filtering on the reference sample. In other words, bilateral filter unit 231 may obtain the flag from the bitstream via entropy decoder 202. Bilateral filter unit 231 switches whether to perform filtering on the reference sample using a bilateral filter according to the value (0 or 1) indicated by the flag.

Here, the bitstream may hide the flag as described above. In this case, bilateral filter unit 231 determines whether the total sum of all of the coefficients included in the block is an odd number or an even number, and identifies the value of the hidden flag according to the result of the determination. For example, bilateral filter unit 231 determines that the flag indicates 1 when the total sum of the coefficients is an odd number, and performs filtering using a bilateral filter. When the total sum of the coefficients is an even number, bilateral filter unit 231 determines that the flag indicates 0, and does not perform filtering using a bilateral filter.

In addition, bilateral filter unit 231 may determine whether or not filtering is to be performed on the reference sample, based on a block size of the current block to be predicted and an intra prediction mode.

FIG. 14 is a flowchart indicating a first example of processing operations performed by bilateral filter unit 131 of encoding device 100A according to this embodiment.

Bilateral filter unit 131 identifies the block size of a current block to be predicted and an intra prediction mode (Step S101).

Next, bilateral filter unit 131 determines whether or not to perform filtering on the reference sample having the identified block size in intra prediction mode (Step S102). For example, the block size and intra prediction mode for the reference sample on which filtering is performed are determined in advance. In this case, bilateral filter unit 131 may determine to perform filtering when any one of the block size and intra prediction mode identified in Step S101 matches the corresponding one of the predetermined block size and the intra prediction mode. Alternatively, bilateral filter unit 131 may determine to perform filtering when both of the block size and intra prediction mode identified in Step S101 match the predetermined block size and intra prediction mode. More specifically, bilateral filter unit 131 may determine to perform filtering when the block size of the current block to be predicted is small. In addition, bilateral filter unit 131 may determine not to perform filtering when the intra prediction mode for the current block to be predicted is one of a planar prediction mode and a DC prediction mode, and may determine to perform filtering when the intra prediction mode is a directive prediction mode.

Here, when determining to perform filtering (yes in Step S102), bilateral filter unit 131 applies a bilateral filter to the reference sample (Step S103). When determining not to perform filtering (no in Step S102), bilateral filter unit 131 does not perform filtering on the reference sample (Step S104).

Bilateral filter unit 231 of decoding device 200A according to this embodiment may operate according to the flowchart illustrated in FIG. 14.

Figure 15A:
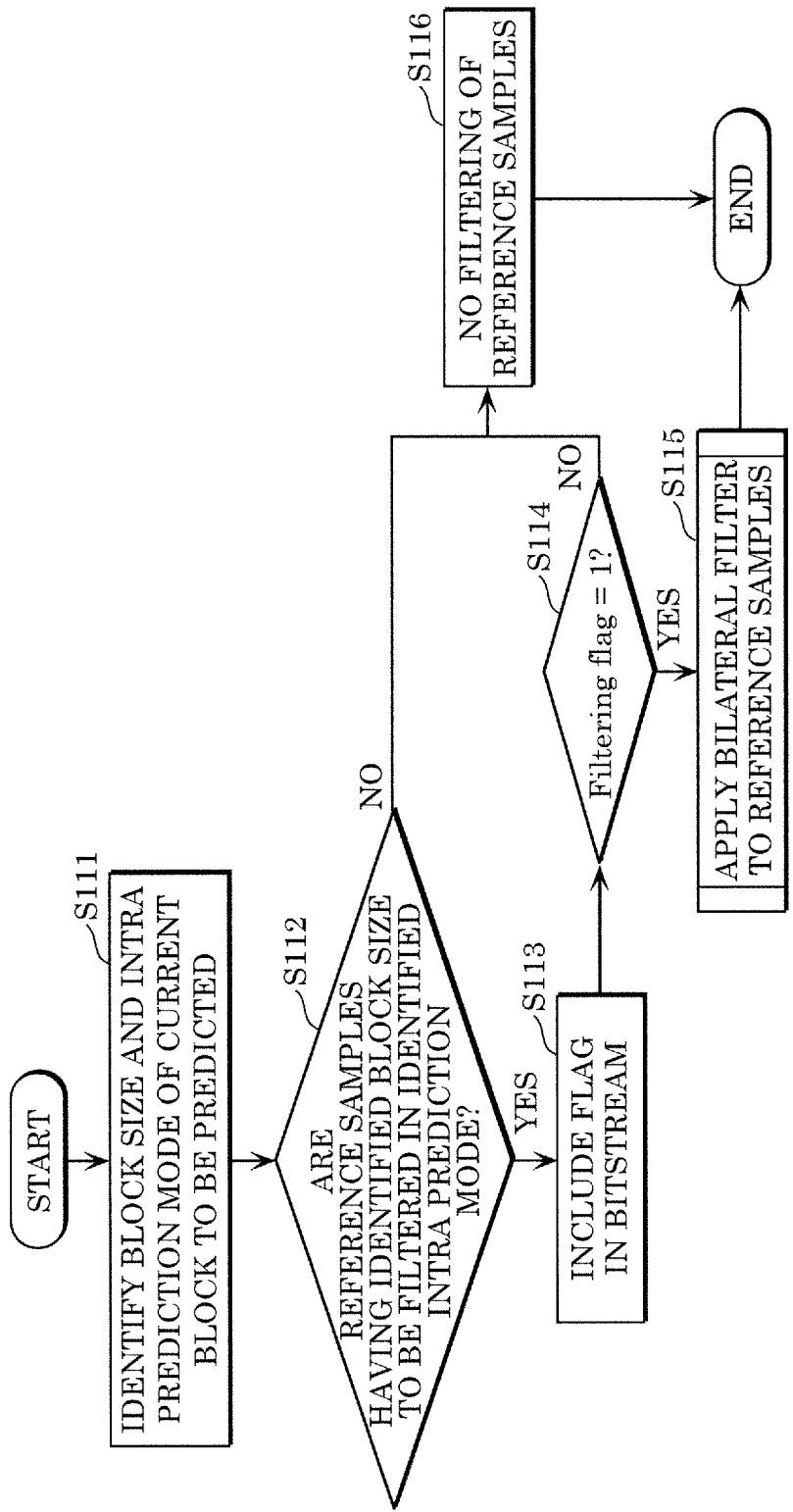
FIG. 15A is a flowchart indicating a second example of processing operations performed by the bilateral filter of the encoding device according to Embodiment 2.

FIG. 15A is a flowchart indicating a second example of processing operations performed by bilateral filter unit 131 of encoding device 100A according to this embodiment.

Bilateral filter unit 131 identifies the block size of a current block to be predicted and an intra prediction mode (Step S111).

Next, bilateral filter unit 131 determines whether or not to perform filtering on the reference sample having the identified block size in intra prediction mode (Step S112).

Here, when determining to perform filtering (yes in Step S112), bilateral filter unit 131 performs a process for including a flag in a bitstream (Step S113). More specifically, bilateral filter unit 131 outputs the flag to entropy encoder 110, thereby causing entropy encoder 110 to include the flag in the bitstream. Bilateral filter unit 131 determines whether or not the flag (filtering flag) indicates 1 (Step S114), and when determining that the flag indicates 1 (yes in Step S114), applies a bilateral filter to the reference sample (Step S115).

When determining not to perform filtering (no in Step S112), bilateral filter unit 131 does not perform filtering on the reference sample (Step S116). Alternatively, even when determining that the above-described flag indicates 0 in Step S114 (no in Step S114), bilateral filter unit 131 does not perform filtering on the reference sample (Step S116).

Figure 15B:
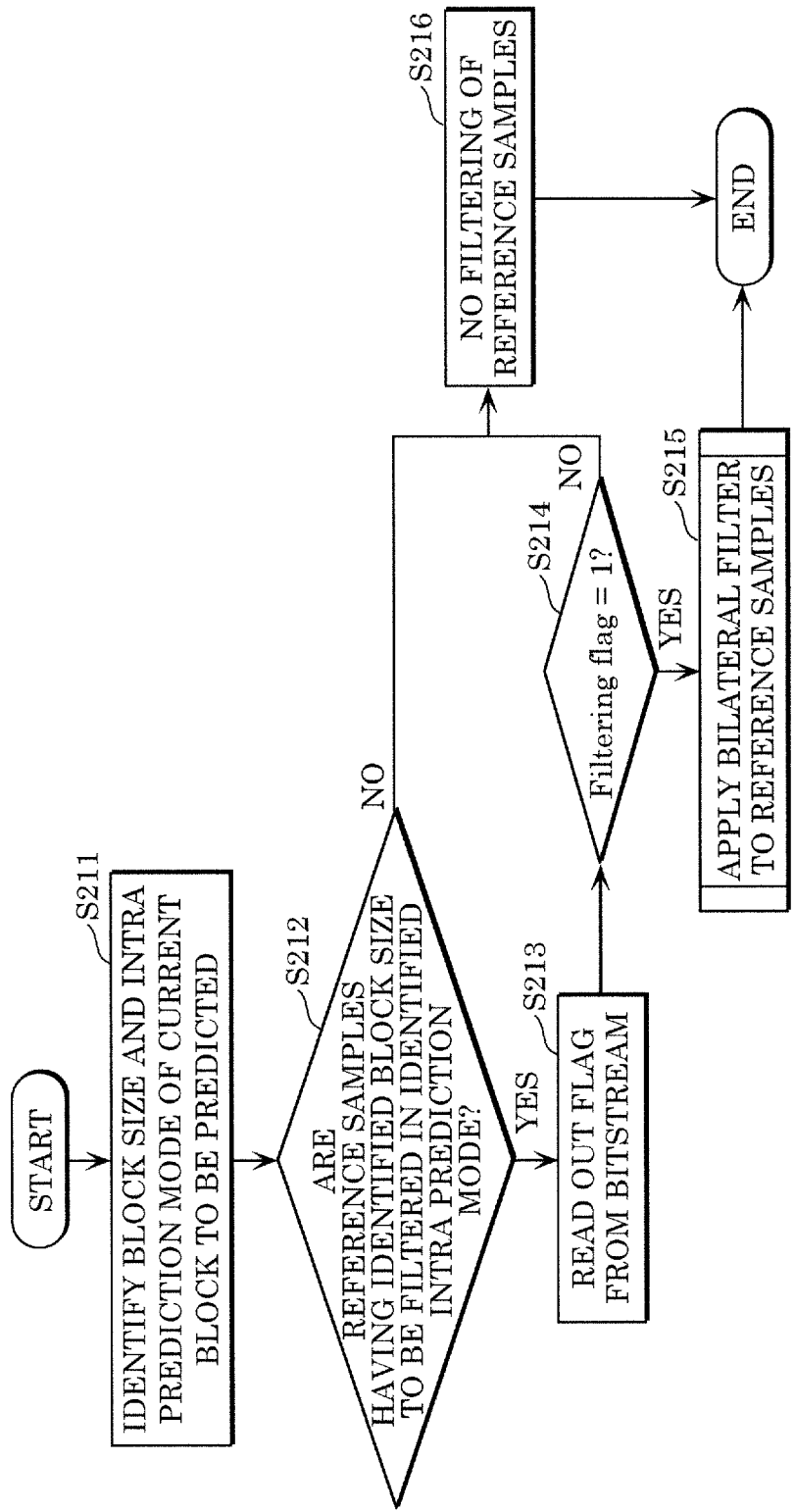
FIG. 15B is a flowchart indicating a second example of processing operations performed by a bilateral filter of the decoding device according to Embodiment 2.

FIG. 15B is a flowchart indicating a second example of processing operations performed by bilateral filter unit 231 of decoding device 200B according to this embodiment.

Bilateral filter unit 231 identifies the block size of a current block to be predicted and an intra prediction mode (Step S211).

Next, bilateral filter unit 231 determines whether or not to perform filtering on the reference sample having the identified block size in the identified intra prediction mode (Step S212).

Here, when determining to perform filtering (yes in Step S212), bilateral filter unit 231 performs a process for reading out a flag from a bitstream (Step S213). In other words, bilateral filter unit 231 may obtain the flag from the bitstream via entropy decoder 202. Bilateral filter unit 231 determines whether or not the flag (filtering flag) indicates 1

(Step S214), and when determining that the flag indicates 1 (yes in Step S214), applies a bilateral filter to the reference sample (Step S215).

When determining not to perform filtering in Step S212 (no in Step S212), bilateral filter unit 231 does not perform filtering on the reference sample (Step S216). Alternatively, even when determining that the above-described flag indicates 0 in Step S214 (no in Step S214), bilateral filter unit 231 does not perform filtering on the reference sample (Step S216).

Figure 16A:
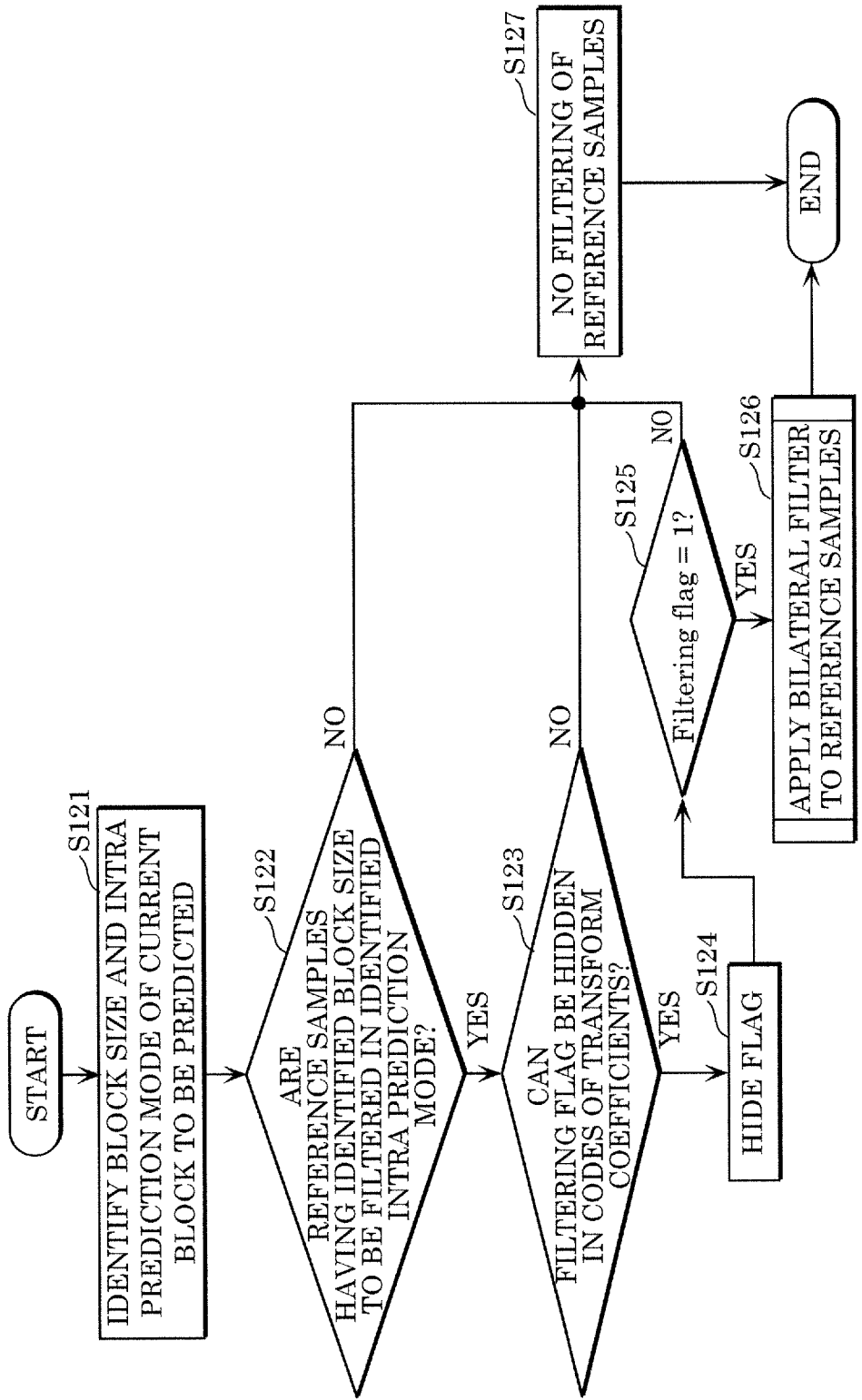
FIG. 16A is a flowchart indicating a third example of processing operations performed by a bilateral filter of the encoding device according to Embodiment 2.

FIG. 16A is a flowchart indicating a third example of processing operations performed by bilateral filter unit 131 of encoding device 100A according to this embodiment.

Bilateral filter unit 131 identifies the block size of the current block to be predicted and the intra prediction mode (Step S121).

Next, bilateral filter unit 131 determines whether or not to perform filtering on the reference sample having the identified block size in the identified intra prediction mode (Step S122).

Here, when determining to perform filtering (yes in Step S122), bilateral filter unit 131 determines whether or not the flag can be hidden in a plurality of coefficients inside a block (Step S123). When determining that the flag can be hidden as such (yes in Step S123), bilateral filter unit 131 performs a process for hiding the flag in the bitstream (Step S124). In other words, bilateral filter unit 131 causes entropy encoder 110 to add 1 to or subtract 1 from any of the coefficients so that the total sum of all of the coefficients inside the block becomes an odd number or an even number according to the value of the flag. Bilateral filter unit 131 determines whether or not the flag (filtering flag) indicates 1 (Step S125), and when determining that the flag indicates 1 (yes in Step S125), applies a bilateral filter to the reference sample (Step S126).

When determining not to perform filtering in Step S122 (no in Step S122), bilateral filter unit 131 does not perform filtering on the reference sample (Step S127). In another case, when determining that the above-described flag cannot be hidden in Step S123 (no in Step S123), bilateral filter unit 131 does not perform filtering on the reference sample (Step S127). In another case, when determining that the above-described flag indicates 0 in Step S125 (no in Step S125), bilateral filter unit 131 does not perform filtering on the reference sample (Step S127).

Figure 16B:
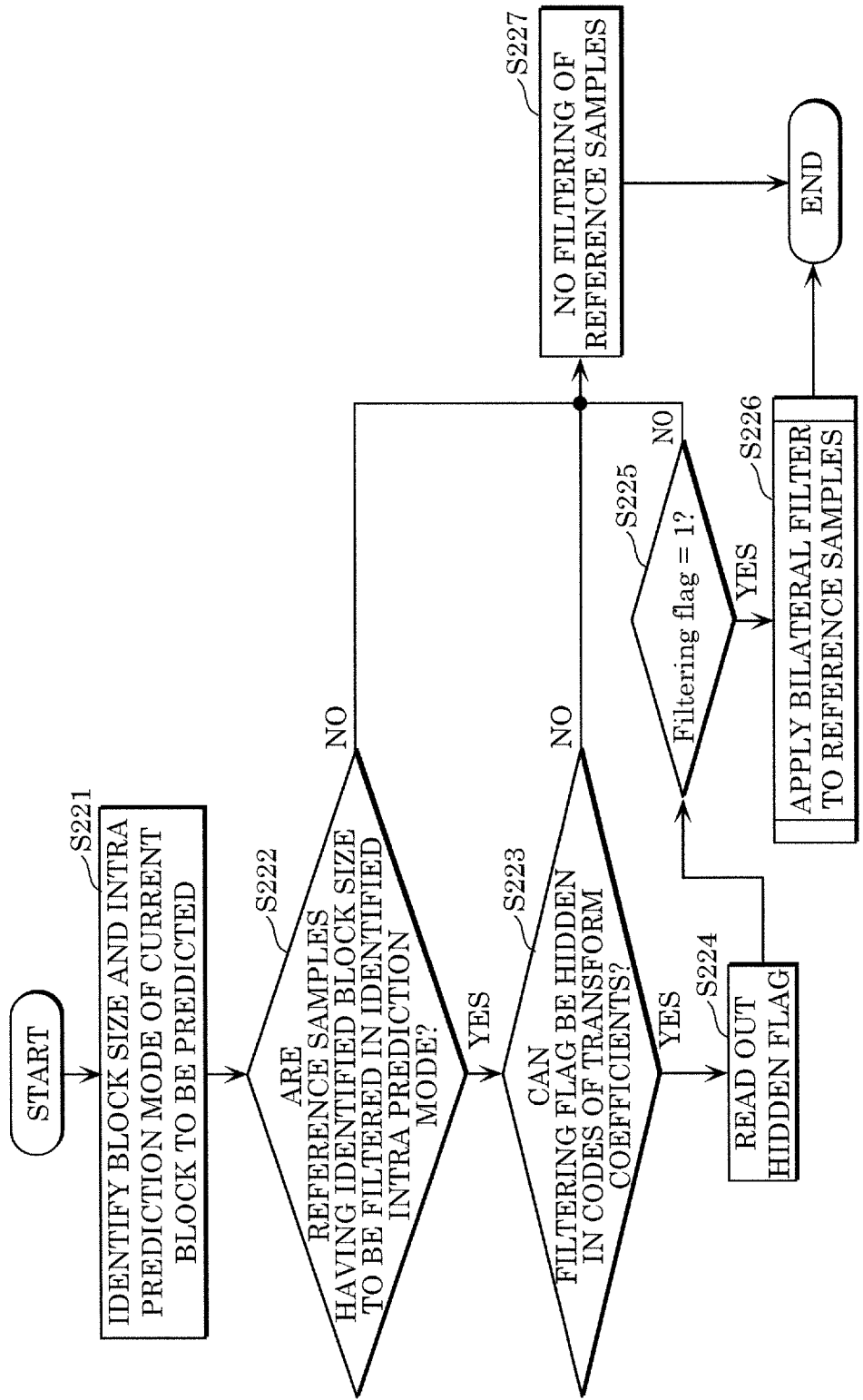
FIG. 16B is a flowchart indicating a third example of processing operations performed by the bilateral filter of the decoding device according to Embodiment 2.

FIG. 16B is a flowchart indicating a third example of processing operations performed by bilateral filter unit 231 of decoding device 200A according to this embodiment.

Bilateral filter unit 231 identifies the block size of a current block to be predicted and an intra prediction mode (Step S221).

Next, bilateral filter unit 231 determines whether or not to perform filtering on a reference sample having the identified block size in the identified intra prediction mode (Step S222).

Here, when determining to perform filtering (yes in Step S222), bilateral filter unit 231 determines whether or not the flag can be hidden in a plurality of coefficients inside a block (Step S223). When determining that the flag can be hidden as such (yes in Step S223), bilateral filter unit 231 performs a process for reading out the hidden flag from the bitstream (Step S224). In other words, bilateral filter unit 231 determines whether the total sum of all of the coefficients inside the block included in the bitstream is an odd number or an even number, and identifies the value of the hidden flag according to the result of the determination. Bilateral filter unit 231 determines whether or not the flag (filtering flag) indicates 1 (Step S225), and when determining that the flag indicates 1 (yes in Step S225), applies a bilateral filter to the reference sample (Step S226).

When determining not to perform filtering in Step S222 (no in Step S222), bilateral filter unit 231 does not perform filtering on the reference sample (Step S227). In another case, when determining that the above-described flag cannot be hidden in Step S223 (no in Step S223), bilateral filter unit 231 does not perform filtering on the reference sample (Step S227). In another case, when determining that the above-described flag indicates 0 in Step S225 (no in Step S225), bilateral filter unit 231 does not perform filtering on the reference sample (Step S227).

[Size of Bilateral Filter]

A bilateral filter is a one-dimensional filter. This is because a plurality of pixels to be respectively used as reference samples are only either the plurality of pixels arranged in a column on the left of a current block to be predicted or the plurality of pixels arranged in a row above the current block to be predicted.

The size s of the one-dimensional bilateral filter is, for example, three taps or five taps for all off the block sizes.

Alternatively, the size s of the one-dimensional bilateral filter is smaller or larger when the block size is smaller or larger. For example, when the block size is 4×4 or 8×4, the size s of the bilateral filter is three taps. When the block size is 8×8, 16×8, or 8×16, the size s of the bilateral filter is five taps.

It is to be noted that the block size to be used to determine the size s of the bilateral filter is not the size of a surrounding block to which the reference sample belongs but the sizes of a current block to be predicted.

Alternatively, the bilateral filter may be a two-dimensional filter. In this case, a plurality of pixels arranged in a plurality of columns on the left of the current block to be predicted or a plurality of pixels arranged in a plurality of rows above the current block to be predicted are respectively used as reference samples

[Weight of Bilateral Filter]

Weight $\omega$ which is used for bilateral filtering is calculated, for example, using spatial parameter $\sigma d$ and range parameter $\sigma_Y$.

The spatial parameter $\sigma d$ controls a spatial size of a filter. As in a conventional smoothing for intra prediction, only a distance to a central pixel (that is, a current reference sample to be processed) is considered.

Range parameter $\sigma_Y$ controls a filtering strength for a pixel using a difference in pixel value with the central pixel.

In the bilateral filtering, weight $\omega$ (i, j, k, l) of reference sample r (k, l) is determined based on both the distance and difference in pixel value between reference sample r (k, l) and central pixel r (i, j) to be filtered.

Here, the positions of the current reference sample to be processed and the reference sample in an orthogonal coordinate system are respectively indicated as (i, j) and (k, l). Furthermore, the pixel values of the current reference sample to be processed and the reference sample are of the current reference sample to be processed and the reference sample indicated as I (i, j) and I (k, l). In addition, a first parameter and a second parameter which are a spatial parameter and a range parameter are indicated as $\sigma d$ and $\sigma_Y$, respectively. In such a case, bilateral filter unit 131 determines weight $\omega$ (i, j, k, l) of the reference sample according to Expression 3 indicated below. Bilateral filter unit 231 determines weight $\omega$ (i, j, k, l) of the reference sample according to Expression 3 indicated below in the same manner.

[Math. 5]

$$\omega(i, j, k, l) = e^{\left(-\frac{(i-k)^2+(j-l)^2}{2\sigma_d^2} - \frac{\|I(i,j)-I(k,l)\|^2}{2\sigma_Y^2}\right)}$$ (Expression 3)

It is to be noted that current reference sample r (i, j) to be processed may be used as reference sample r (k, l). In short, in this case, the relationships of k=i and l=j are satisfied. Accordingly, weight ω indicating 1 is determined for current reference sample r (i, j) to be processed.

For example, when size s of a bilateral filter is three taps, each of bilateral filter units 131 and 231 performs filtering on current reference sample r (i, j) to be processed, by dividing the sum of ω (i, j, i−1, j)×I (i−1, j), ω (i, j, i, j)×I (i, j), and ω (i, j, i+1, j)×I (i+1, j) by an integral value of each weight.

Spatial parameter σd indicates a larger value when the size of the current block to be predicted is larger. Spatial parameter σd may depend on the position of a neighboring pixel around a block boundary. In other words, spatial parameter σd for bilateral filtering performed on a reference sample close to the block boundary may be larger than spatial parameter σd for bilateral filtering performed on a reference sample distant from the block boundary. In this way, the reference sample closer to the block boundary can be subjected to strong smoothing. It is to be noted that the block boundary is the boundary with an already reconstructed block to which the reference sample belongs.

Spatial parameter σd may be included in at least one of a picture parameter set and a slice header, and be transmitted. In addition, spatial parameter σd may be fixed for the entire picture.

Range parameter σ$_Y$ may depend on a quantization parameter (QP). For example, when the QP of a block to which a reference sample belongs is smaller, range parameter σ$_Y$ for the reference sample indicates a larger value. In addition, range parameter σ$_Y$ may be included in at least one of a picture parameter set and a slice header, and be transmitted. In addition, range parameter σ$_Y$ may be calculated by encoding device 100A according to the contrast of a picture or a slice.

In this embodiment, as indicated in Expression 3, bilateral filter unit 131 determines a smaller weight for reference sample r (k, l) when a distance is longer when determining weight ω for reference sample r (k, l). More specifically, the distance is a distance between current reference sample r (i, j) that is the above-described central pixel and reference sample r (k, l).

In this way, only the smaller weight is determined for the reference sample distant from the current reference sample to be processed, and the larger weight is determined for the reference sample close to the current reference sample to be processed. Accordingly, it is possible to perform spatially appropriate filtering for the current reference sample to be processed.

In this embodiment, as indicated in Expression 3, bilateral filter unit 131 determines the smaller weight for reference sample r (k, l) when the difference in pixel value is larger when determining weight ω for reference sample r (k, l). More specifically, the difference in pixel value is the difference between pixel value I (i, j) of current reference sample to be processed r (i, j) and pixel value I (k, l) of reference sample r (k, l). Pixel values I (i, j) and I (k, l) are specifically luminance values.

In this way, it is possible to appropriately maintain the edges included in the plurality of reference samples.

[Spatial Parameter σd]

Figure 17:
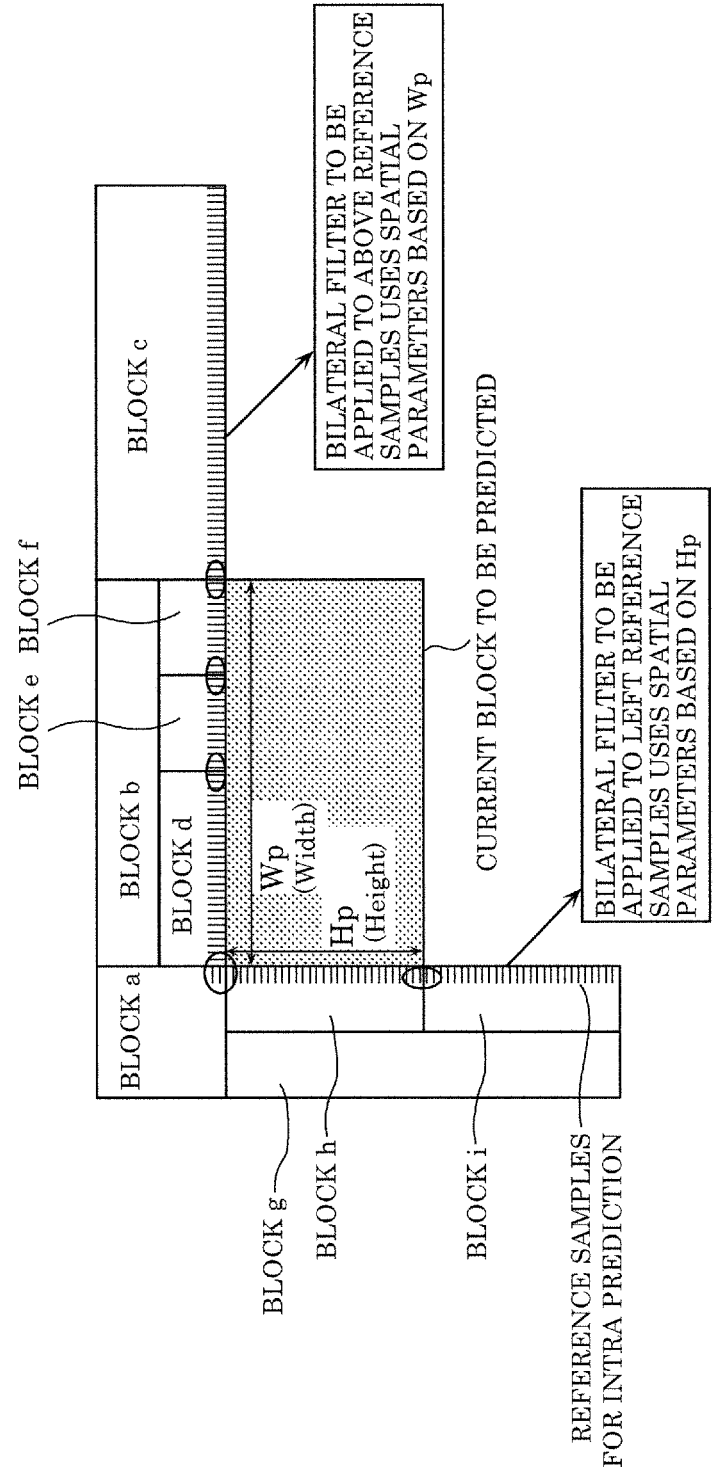
FIG. 17 is a diagram for illustrating spatial parameters according to Embodiment 2.

FIG. 17 is a diagram for illustrating spatial parameters σd. For example, the size of a current block to be predicted has a size of width Wp×height Hp. When the reference sample located above the current block to be predicted is used for intra prediction of the current block to be predicted, the reference sample is subjected to bilateral filtering using spatial parameter σd based on width Wp. When the reference sample located on the left of the current block to be predicted is used for intra prediction of the current block to be predicted, the reference sample is subjected to bilateral filtering using spatial parameter σd based on height Hp. For example, when the width Wp or height Hp is larger, spatial parameter σd indicating a larger value is used by the bilateral filter.

Furthermore, as described above, in bilateral filtering performed on a pixel adjacent to a block boundary (that is a current reference sample to be processed), spatial parameter σd indicating a larger value may be used for performing stronger smoothing. Examples of the block boundary include block boundaries as illustrated in FIG. 17 such as the block boundary between block a and block d, the block boundary between block d and block e, the block boundary between block h and block i, etc. In other words, spatial parameter σd for bilateral filtering performed on each reference sample close to a corresponding one of the block boundaries may be larger than the spatial parameter σd for bilateral filtering performed on a reference sample distant from the block boundary.

It is to be noted that spatial parameter σd may be derived either from a table or using a function having, as variables, above-described width Wp or height Hp and the distance from the block boundary. For example, the table indicates, for each of groups each including width Wp or height Hp and the distance from the block boundary, spatial parameter σd corresponding to the group.

In this way, when determining a weight for a reference sample in this embodiment, bilateral filter unit 131 determines the smaller weight for the reference sample when the ratio of the above-described distance with respect to the first parameter based on the block size of the current block to be predicted is larger. First parameter is spatial parameter σd. In addition, the first parameter indicates a larger value when the size of the current block to be predicted is larger.

In this way, since the ratio of the distance with respect to the first parameter is larger when the block size is smaller, the smaller weight is determined for the reference sample. Accordingly, it is possible to prevent detailed expression of an image represented by a plurality of reference samples from disappearing due to filtering.

[Range Parameter σ$_Y$]

Range parameter σ$_Y$ is derived as a value suitable for the contrast of the image in encoding device 100A, and is transmitted by, for example, being included in a picture parameter set.

Range parameter σ$_Y$ has a small value so that a weight becomes 0 in the case where the difference in lightness between a plurality of reference samples is small. In the opposite case where the difference in lightness between a plurality of reference samples is large, range parameter σ$_Y$ has a large value so that a weight becomes large and stronger smoothing is performed.

Alternatively, range parameter σ$_Y$ may be determined using an already reconstructed block and a QP. Furthermore, as in the case of spatial parameter σd, range parameter σ$_Y$ for bilateral filtering to be performed on a reference sample close to a block boundary may indicate a larger value.

It is to be noted that spatial parameter σd may be derived either from a table or using a function having, as variables, the contrast, the QP, and the distance from the block boundary described above. The table indicates, for each of groups each including the contrast, the QP, and the distance from the block boundary described above, range parameter $\sigma_Y$ corresponding to the group.

In this way, in this embodiment, when determining a weight for a reference sample, bilateral filter unit 131 determines the smaller weight for the reference sample when the ratio of the difference in pixel value with respect to the second parameter based on the contrast of the plurality of reference samples is higher. The second parameter is range parameter $\sigma_Y$. In addition, the second parameter indicates the smaller value when the contrast of the plurality of reference samples is lower.

In this way, since the ratio of the difference in pixel value with respect to the second parameter is larger when the contrast is lower, the smaller weight is determined for the reference sample. Accordingly, it is possible to prevent detailed expression of an image represented by a plurality of reference samples from disappearing due to filtering.

Figure 18:
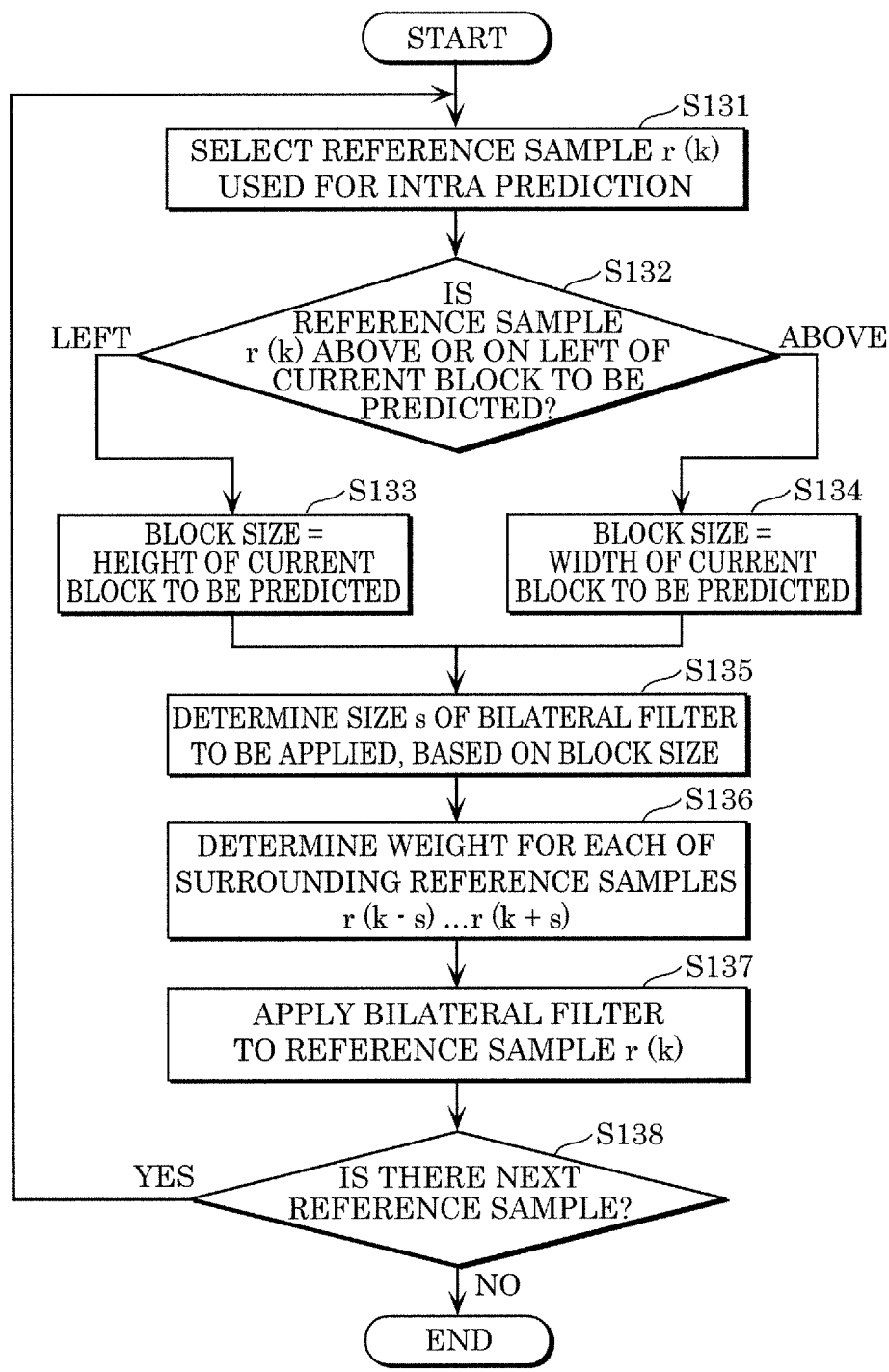
FIG. 18 is a flowchart indicating bilateral filtering processes performed by the bilateral filter unit according to Embodiment 2.

FIG. 18 is a flowchart indicating bilateral filtering processes by bilateral filter unit 131.

Bilateral filter unit 131 selects, as a current reference sample to be processed, a reference sample r (k) to be used for intra prediction (Step S131).

Next, bilateral filter unit 131 determines whether reference sample r (k) is located above or on the left of the current block to be predicted (Step S132).

Here, when determining that reference sample r (k) is located on the left of the current block to be predicted (the answer is LEFT in Step S132), bilateral filter unit 131 sets the block size to height Hp of the current block to be predicted (Step S133). When determining that reference sample r (k) is located above the current block to be predicted (the answer is ABOVE in Step S132), bilateral filter unit 131 sets the block size to width Wp of the current block to be predicted (Step S134).

Next, bilateral filter unit 131 determines size s for the bilateral filtering performed on reference sample r (k), based on the block size which has been set in Steps S133 and S134 (Step S135). Size s is, for example, three taps, five taps, or the like.

Next, bilateral filter unit 131 determines a weight for each of a plurality of reference samples r (k−s), . . . , r (k+s) according to size s, based on the distance between the reference sample and reference sample to be processed r (k) and the difference in pixel value between the same (Step S136).

It is to be noted that the plurality of reference samples r (k−s), . . . , r (k+s) includes above-described reference sample r (k). In order to determine a weight, bilateral filter unit 131 may determine spatial parameter σd corresponding to the block size which has been set as described above and range parameter $\sigma_Y$ corresponding to the contrast of the plurality of reference samples r (k−s), . . . , r (k+s). In addition, spatial parameter σd may be a larger value when reference sample r (k) is closer to a block boundary as described above. In addition, the contrast for determining range parameter $\sigma_Y$ may be the difference between a maximum value and a minimum value in the luminance values of the plurality of reference samples. In addition, the contrast may be the difference between a maximum value and a minimum value in the luminance values of blocks, slices, or pictures including the plurality of reference samples.

Alternatively, a look-up table may be used to determine a weight. In addition, such a look-up table may be determined for a picture according to range parameter $\sigma_Y$ prior to encoding and decoding. The look-up table may indicate, for each of groups, a weight corresponding to the group. Here, the group includes spatial parameter σd, range parameter $\sigma_Y$, the distance between reference samples, and the difference in pixel value between the reference samples.

Next, bilateral filter unit 131 applies a bilateral filter to reference sample r (k), using the weight determined for each of the reference samples in Step S136 (Step S137).

Bilateral filter unit 131 determines whether or not there is a next current reference sample to be processed (Step S138). Here, when determining that there is a next reference sample to be processed (yes in Step S138), bilateral filter unit 131 repeatedly executes the processes starting with Step S131. When determining that there is no next reference sample to be processed (no in Step S138), bilateral filter unit 131 ends the bilateral filtering processes.

Bilateral filter unit 231 of decoding device 200A according to this embodiment may also operate according to the flowchart illustrated in FIG. 18.

[Adaptive Reference Sample Smoothing]

Here, bilateral filtering in this embodiment may be used instead of adaptive reference sample smoothing.

The adaptive reference sample smoothing is performed on reference samples in order for intra prediction as with bilateral filtering.

Each of blocks is predicted using the pixel values of a plurality of reconstructed pixels (reference samples) of surrounding blocks. Smoothing is performed on each of reference samples using any one of two smoothing filters. A first smoothing filter is a 3-tap filter with weights of [1, 2, 1]/4, and the weights of [1, 2, 1]/4 are used for three reference samples. In other words, weights of ¼, 2/4, and ¼ are used. A second smoothing filter is a 5-tap filter with weights of [2, 3, 6, 3, 2]/16, and the weights of [2, 3, 6, 3, 2]/16 are used for five reference samples. In other words, weights of 2/16, 3/16, 6/16, 3/16, and 2/16 are used.

A flag indicating whether or not each reference sample is subjected to smoothing is transmitted to the decoding device. This flag may be hidden. The smoothing filter is selected based on a block size and the prediction mode for the block. No flag is transmitted for small blocks of 4×4, 8×4, and 4×8. This is because smoothing is never applied to the blocks each having any of the above sizes. No flag is transmitted also when the intra prediction mode for the block is a DC prediction mode. This is because smoothing is never applied together with DC prediction.

Figure 19:
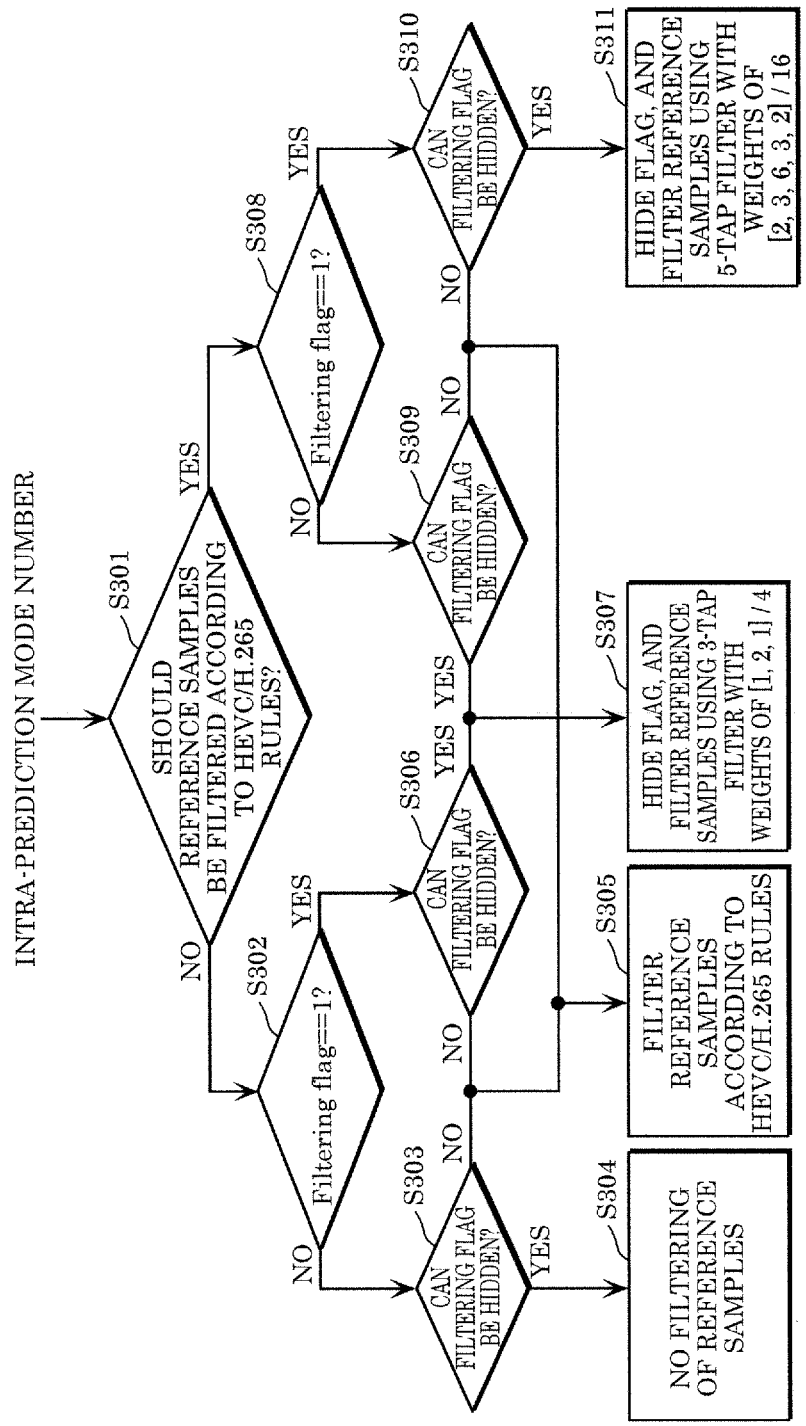
FIG. 19 is a flowchart relating to adaptive reference sample smoothing.

FIG. 19 is a flowchart relating to adaptive reference sample smoothing.

First, the encoding device determined whether or not to perform filtering on a reference sample in a specified intra prediction mode number, according to the rules of HEVC/H.265 (Step S301). Here, when determining that the reference sample should not be filtered (no in Step S301), whether a filtering flag indicates 1 or not is further determined (Step S302). Here, when determining that the flag does not indicate 1 (no in Step S302), the encoding device further determines whether the flag can be hidden (Step S303). Here, when determining that the flag can be hidden (yes in Step S303), the reference sample is not filtered (Step S304). When determining that the flag cannot be hidden (no in Step S303), the encoding device performs filtering on the reference sample according to the rules of HEVC/H.265 (Step S305).

The encoding device also determines whether the flag can be hidden or not (Step S306) also when determining that the flag indicates 1 (yes in Step S302). Here, when determining that the flag cannot be hidden (no in Step S306), the encoding device performs filtering on the reference sample according to the rules of HEVC/H.265 (Step S305). When determining that the flag can be hidden (yes in Step S306), the encoding device hides the flag, and performs filtering on the reference sample using a 3-tap filter with weights of [1, 2, 1]/4 (Step S305).

When determining that the reference sample should be filtered in Step S301 (yes in Step S301), whether a filtering flag indicates 1 or not is further determined (Step S308). Here, when determining that the flag does not indicate 1 (no in Step S308), the encoding device further determines whether the flag can be hidden or not (Step S309). Here, the encoding device performs the process in Step S307 described above when determining that the flag can be hidden (yes in Step S309), and performs the process in Step S305 described above when determining that the flag cannot be hidden (no in Step S309).

When determining that the flag indicates 1 in Step S308 (yes in Step S308), the encoding device determines whether the flag can be hidden or not (Step S310). When determining that the flag can be hidden (yes in Step S310), the encoding device hides the flag, and performs filtering on the reference sample using a 5-tap filter with weights of [2, 3, 6, 3, 2]/16 (Step S311). When determining that the flag cannot be hidden (no in Step S310), the encoding device performs the process in Step S305 described above.

Adaptive reference sample smoothing as such may be replaced with bilateral filtering. Alternatively, whether or not to perform smoothing on a reference sample using a bilateral filter may be switched. For example, whether or not to perform smoothing on each of blocks having a small size of 4×4, 8×4, or 4×8 may be switched.

Whether or not to apply a bilateral filter may be determined according to an intra prediction mode selected for a current block to be predicted. For example, bilateral filtering may be performed only in a most frequently used intra prediction mode (for example, a planar mode). Alternatively, a bilateral filter may be applied in all of second prediction directions, and any bilateral filter may not be applied in the rest of prediction directions. For example, the second prediction directions correspond to directions having any one of odd or even intra prediction mode numbers, and the rest of prediction directions correspond to directions having the other one of odd or even intra prediction mode numbers.

EXAMPLES

Figure 20A:
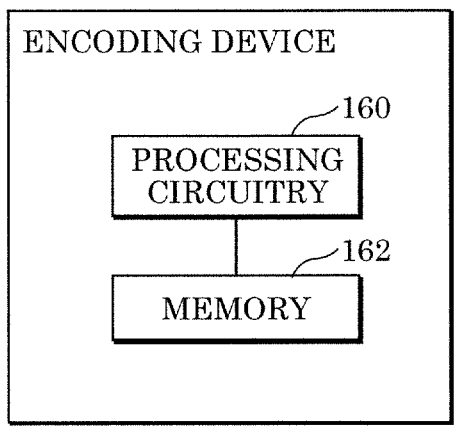
FIG. 20A is a block diagram illustrating an implementation example of the encoding device according to each of the embodiments.

FIG. 20A is a block diagram illustrating an implementation example of the encoding device according to each of the above-described embodiments. The encoding device includes processing circuitry 160 and memory 162. For example, a plurality of constituent elements of the encoding device illustrated in FIG. 1 or FIG. 11 are implemented by processing circuitry 160 and memory 162 illustrated in FIG. 20A.

Processing circuitry 160 is circuitry for performing information processing, and is capable of accessing memory 162. For example, processing circuitry 160 is an exclusive or general electronic circuitry for encoding video. Processing circuitry 160 may be a processor such as a CPU. In addition, processing circuitry 160 may be an electronic circuit assembly. For example, processing circuitry 160 may take rules as the plurality of constituent elements except for the constituent elements for storing information of the encoding device illustrated in FIG. 1 or FIG. 11.

Memory 162 is a general or exclusive memory in which information to be used by processing circuitry 160 to encode video is stored. Memory 162 may be an electronic circuit, and may be connected to processing circuitry 160. Memory 162 may be included in processing circuitry 160. In addition, memory 162 may be an electronic circuit assembly. Memory 162 may be a magnetic disc, an optical disc, or the like, or may be represented as a storage, a recording media, or the like. Memory 162 may be a non-volatile memory, or a volatile memory.

For example, a video to be encoded or a bit string corresponding to an encoded video may be stored in memory 162. Alternatively, a program to be used by processing circuitry 160 to encode a video may be stored in memory 162.

For example, memory 162 may take rules as the constituent elements for storing information among the plurality of constituent elements of the encoding device illustrated in FIG. 1 or FIG. 11. Specifically, memory 162 may take the rules as block memory 118 and frame memory 122 illustrated in FIG. 1 or FIG. 11. More specifically, processed sub-blocks, processed blocks, processed pictures etc. may be stored in memory 162.

It is to be noted that all of the plurality of constituent elements illustrated in FIG. 1 or FIG. 11 may not be implemented in the encoding device, and that all of the plurality of processes described above may not be performed in the encoding device. Some part of the plurality of constituent elements illustrated in FIG. 1 or FIG. 11 may be included in another device, and some part of the plurality of processes described above may be executed by the other device.

Figure 20B:
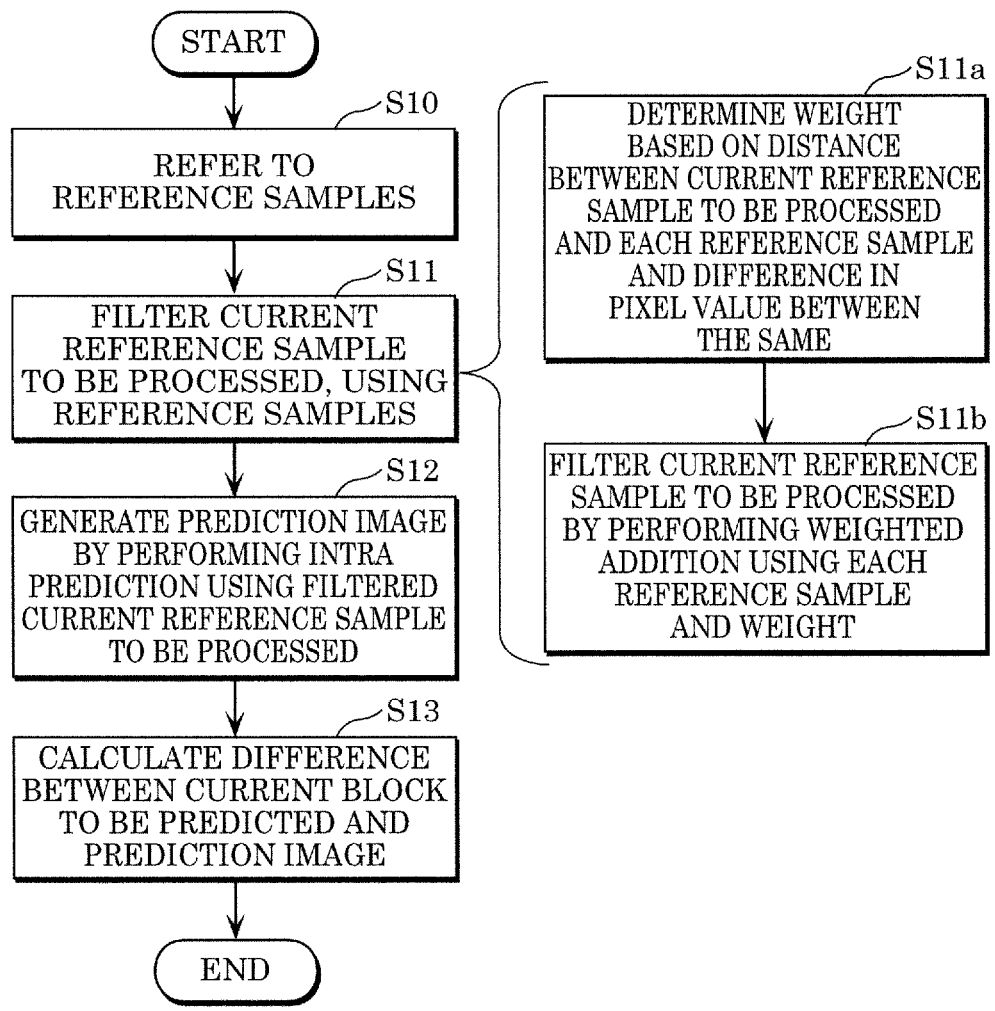
FIG. 20B is a flowchart indicating processing operations performed by the encoding device including processing circuitry and memory.

FIG. 20B is a flowchart indicating processing operations performed by the encoding device including processing circuitry 160 and memory 162.

Using memory 162, processing circuitry 160 firstly refers to, as a reference sample, each of a plurality of pixels arranged on the left of or above a current block to be predicted (Step S10). Next, processing circuitry 160 performs filtering on the pixel value of a current reference sample to be processed among the plurality of reference samples, using each of the pixel values of the plurality of reference samples (Step S11). Next, processing circuitry 160 generates a prediction image for the current block to be predicted by performing intra prediction using the pixel value of the filtered current reference sample to be processed (Step S12). Processing circuitry 160 calculates the difference between the current block to be predicted and the prediction image (Step S13).

In the filtering in Step S11, processing circuitry 160 determines a weight for each of the plurality of reference samples, based on the distance between the reference sample and the current reference sample to be processed and the difference in pixel value between the same (Step S11a). Next, processing circuitry 160 performs filtering on the pixel value of the current reference sample to be processed, by performing weighted addition using the pixel value of each of the plurality of reference samples and the determined weight (Step S11b).

Figure 21A:
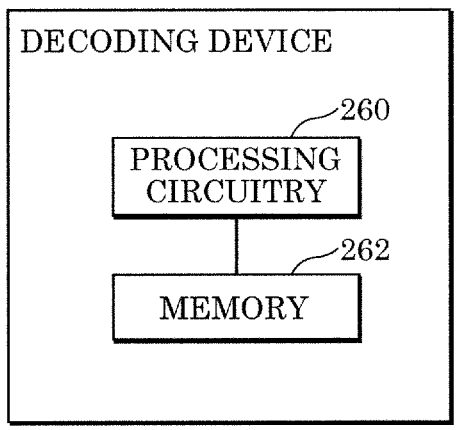
FIG. 21A is a block diagram illustrating an implementation example of the decoding device according to each of the embodiments.

FIG. 21A is a block diagram illustrating an implementation example of the decoding device according to each of the above-described embodiments. The decoding device includes processing circuitry 260 and memory 262. For example, a plurality of constituent elements of the decoding device illustrated in FIG. 10 or FIG. 13 are implemented by processing circuitry 260 and memory 262 illustrated in FIG. 21A.

Processing circuitry 260 is a circuit for performing information processing, and is capable of accessing memory 262. For example, processing circuitry 260 is a general or exclusive electronic circuit for decoding video. Processing circuitry 260 may be a processor such as a CPU. In addition, processing circuitry 260 may be an electronic circuit assembly. For example, processing circuitry 260 may take rules as the plurality of constituent elements except for the constituent elements for storing information of the decoding device illustrated in FIG. 10 or FIG. 13.

Memory 262 is a general or exclusive memory in which information to be used by processing circuitry 260 to decode video is stored. Memory 262 may be an electronic circuit, and may be connected to processing circuitry 260. Memory 262 may be included in processing circuitry 260. In addition, memory 262 may be an electronic circuit assembly. Memory 262 may be a magnetic disc, an optical disc, or the like, or may be represented as a storage, a recording media, or the like. Memory 262 may be a non-volatile memory, or a volatile memory.

For example, a bit string corresponding to an encoded video or a video corresponding to the decoded bit string may be stored in memory 262. Alternatively, a program to be used by processing circuitry 260 to decode a video may be stored in memory 262.

In addition, memory 262 may take the rules as the constituent elements for storing information among the plurality of constituent elements of the decoding device illustrated in FIG. 10 or FIG. 13. Specifically, memory 262 may take the rules as block memory 210 and frame memory 214 illustrated in FIG. 10 or FIG. 13. More specifically, processed sub-blocks, processed blocks, processed pictures etc. may be stored in memory 262.

It is to be noted that all of the plurality of constituent elements illustrated in FIG. 10 or FIG. 13 may not be implemented in the decoding device, and that all of the plurality of processes described above may not be performed in the decoding device. Some part of the plurality of constituent elements illustrated in FIG. 10 or FIG. 13 may be included in another device, and some part of the plurality of processes described above may be executed by the other device.

Figure 21B:
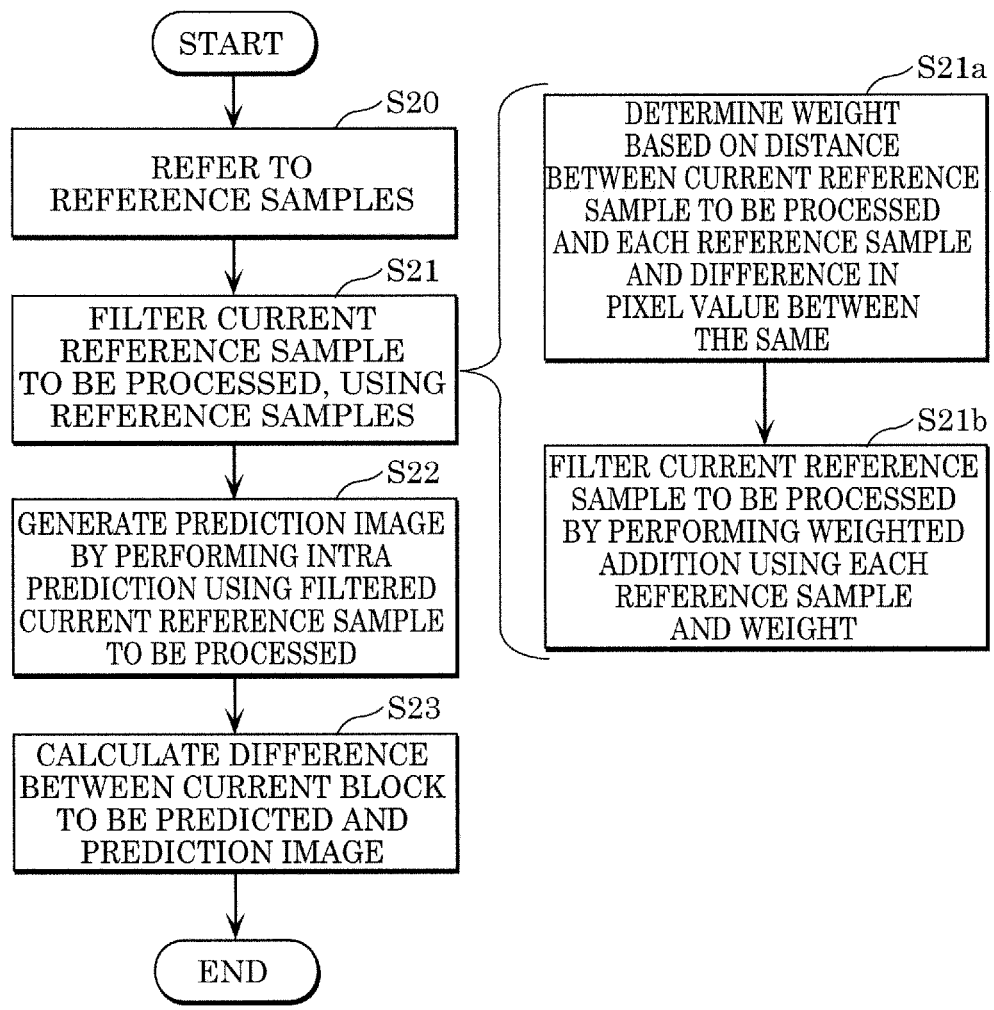
FIG. 21B is a flowchart indicating processing operations performed by the decoding device including processing circuitry and memory.

FIG. 21B is a flowchart indicating processing operations performed by the decoding device including processing circuitry 260 and memory 262.

Using memory 262, processing circuitry 260 firstly refers to, as a reference sample, each of a plurality of pixels arranged on the left of or above an encoded current block to be predicted (Step S20). Next, processing circuitry 260 performs filtering on the pixel values of a current reference sample to be processed among the plurality of reference samples, using the pixel value of each of the plurality of reference samples (Step S21). Next, processing circuitry 260 generates a prediction image for the current block to be predicted by performing intra prediction using the filtered pixel value of the current reference sample to be processed (Step S22). Processing circuitry 160 adds the prediction image to a prediction error obtainable from a bitstream (Step S23).

In the filtering in Step S21, processing circuitry 260 determines a weight for each of the plurality of reference samples, based on the distance between the reference sample and the current reference sample to be processed and the difference in pixel value between the same (Step S21a).

Next, processing circuitry 160 performs filtering on the pixel value of the current reference sample to be processed, by performing weighted addition using the pixel value of each of the plurality of reference samples and the determined weight (Step S21b).

[Supplement]

The encoding devices and decoding devices according to the above-described embodiments may be respectively used as image encoding devices and image decoding devices, or may be used as video encoding devices and video decoding devices.

In each of the above-described embodiments, each of the constituent elements may be configured by exclusive hardware, or may be implemented by executing a software program suitable for the constituent element. Each of the constituent elements may be implemented by means of a program executing unit such as a CPU or a processor reading out and executing a software program recorded on a recording medium such as a hard disc or a semiconductor memory.

More specifically, each of the encoding devices and decoding devices may include: processing circuitry; and storage electrically connected to and accessible from the processing circuitry.

The processing circuitry includes at least one of exclusive hardware or a program execution unit, and executes processes using the storage. When the processing circuit includes the program execution unit, the storage stores a software program which is executed by the program execution unit.

Here, the software for implementing each of the above-described encoding devices and decoding devices is a program as indicated below.

The program causes a computer to execute processes according to any one of the flowcharts in FIGS. 5B, 5D, 14 to 16B, 18, 19, 20B, and 21B.

Each of the constituent elements may be a circuit as described above. These circuits may be configured as a single circuit as a whole, or as separate circuits. In addition, each of the constituent elements may be implemented as a general processor, or an exclusive processor.

In addition, a process that is executed by a particular constituent element may be executed by another constituent element. The execution order of processes may be changed, or a plurality of processes may be executed in parallel. An encoding and decoding device may include an encoding device and a decoding device.

The ordinal numbers such as first, second, etc. used for illustration may be arbitrarily changed. Alternatively, ordinal numbers may be newly assigned to constituent elements etc. or assigned ordinal numbers may be deleted.

Although some aspects of the encoding devices and decoding devices have been described above based on the embodiments, aspects of the encoding devices and decoding devices are not limited to these embodiments. Embodiments obtainable by adding various kinds of modifications that a person skilled in the art would arrive at or embodiments obtainable by combining constituent elements according to different embodiments without deviating from the spirit of the present disclosure may also be included in the scope of the aspects of encoding devices and decoding devices.

Embodiment 3

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments and a system that employs the same will be described. The system is characterized as including an image encoding device that employs the image encoding method, an image decoding device that employs the image decoding method, and an image encoding/decoding device that includes both the image encoding device and the image decoding device. Other configurations included in the system may be modified on a case-by-case basis.

USAGE EXAMPLES

Figure 22:
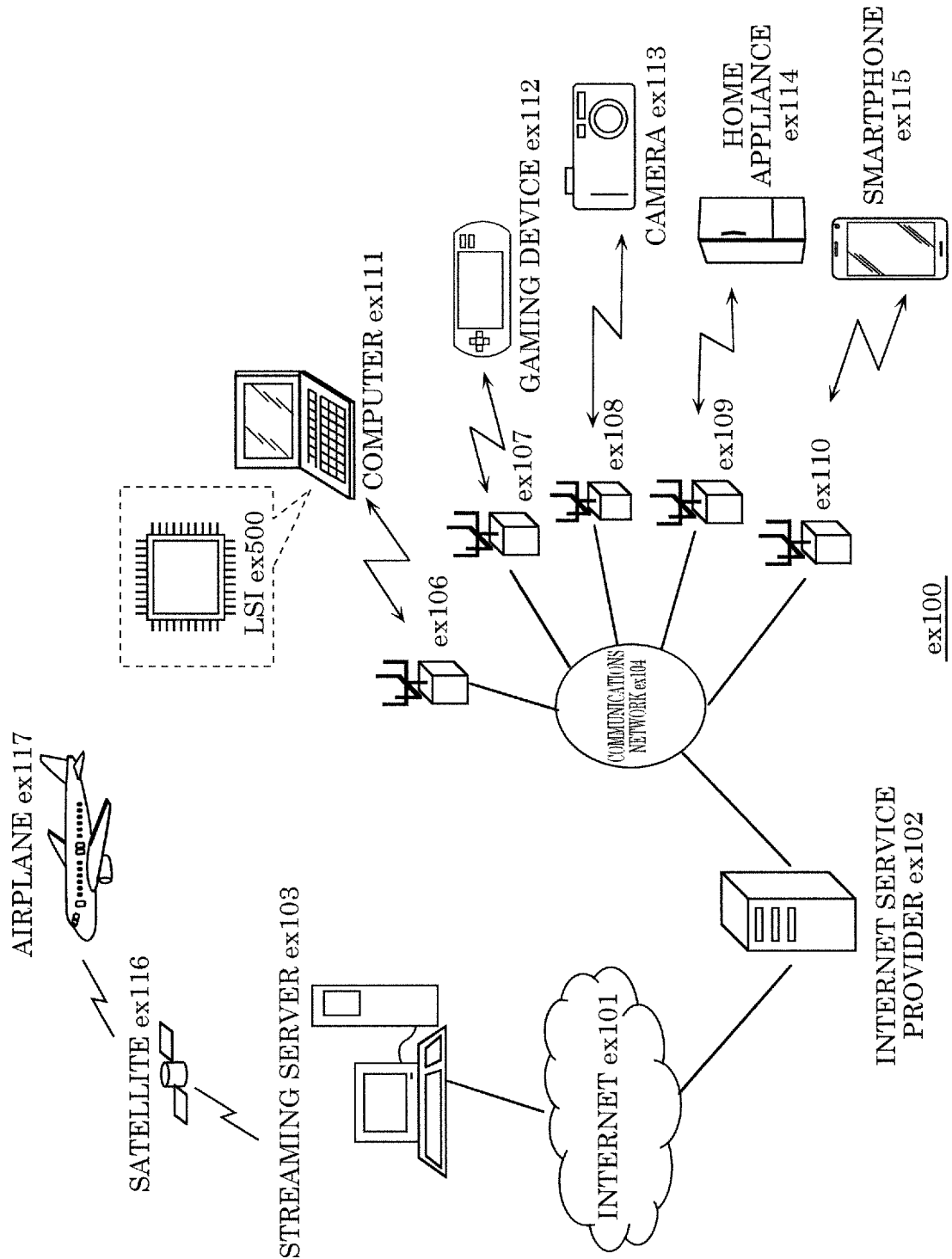
FIG. 22 illustrates an overall configuration of a content providing system for implementing a content distribution service.

FIG. 22 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoding device according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoding device according to one aspect of the present disclosure.

(Decentralized Processing)

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

(3D, Multi-Angle)

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoding device may obtain or store virtual object information and three-dimensional data, generate two-dimensional images based on movement from the perspective of the user, and then generate superimposed data by seamlessly connecting the images. Alternatively, the decoding device may transmit, to the server, motion from the perspective of the user in addition to a request for virtual object information, and the server may generate superimposed data based on three-dimensional data stored in the server in accordance with the received motion, and encode and stream the generated superimposed data to the decoding device. Note that superimposed data includes, in addition to RGB values, an a value indicating transparency, and the server sets the a value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoding device or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

(Scalable Encoding)

Figure 23:
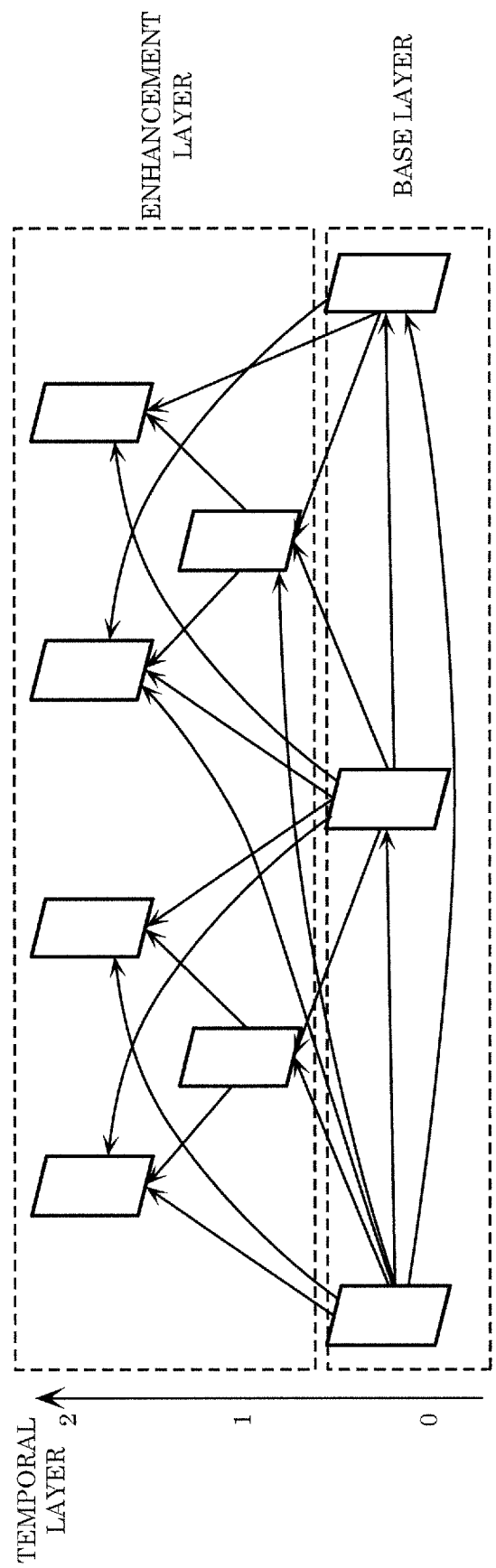
FIG. 23 illustrates one example of encoding structure in scalable encoding.

The switching of content will be described with reference to a scalable stream, illustrated in FIG. 23, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 23. Note that there may be a plurality of individual streams that are of the same content but different quality. In other words, by determining which layer to decode up to based on internal factors, such as the processing ability on the decoding device side, and external factors, such as communication bandwidth, the decoding device side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoding device side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 24:
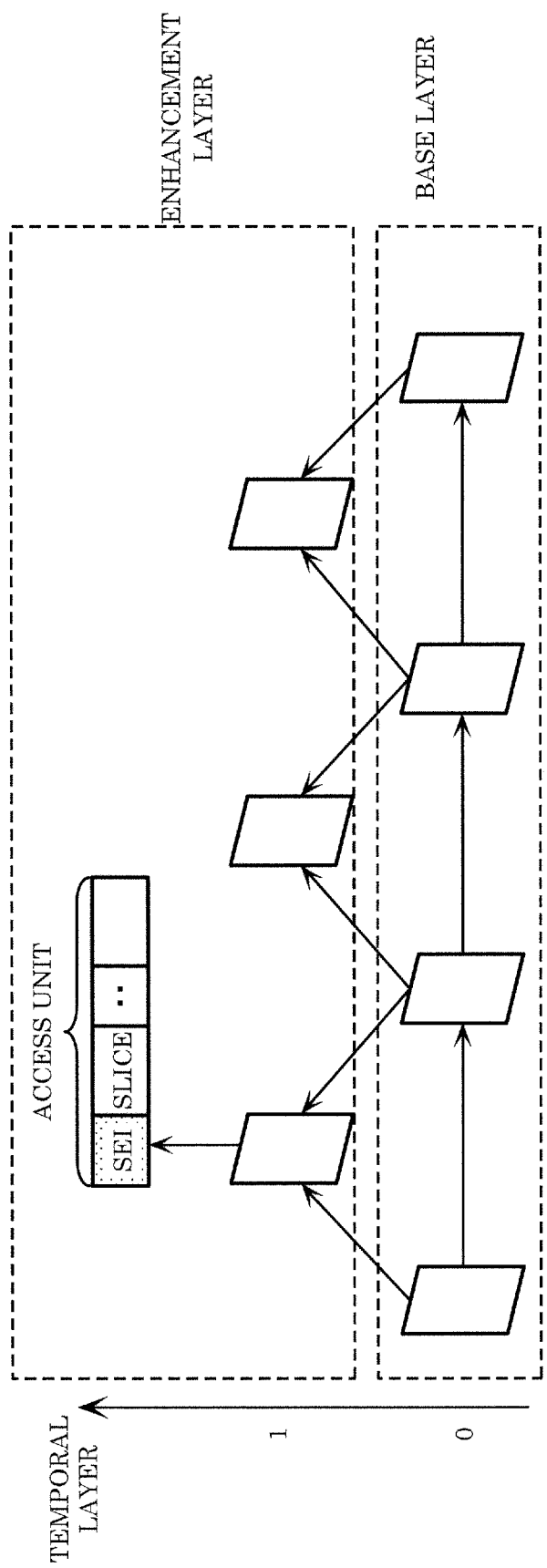
FIG. 24 illustrates one example of encoding structure in scalable encoding.

Alternatively, a configuration in which a picture is divided into, for example, tiles in accordance with the meaning of, for example, an object in the image, and on the decoding device side, only a partial region is decoded by selecting a tile to decode, is also acceptable. Moreover, by storing an attribute about the object (person, car, ball, etc.) and a position of the object in the video (coordinates in identical images) as metadata, the decoding device side can identify the position of a desired object based on the metadata and determine which tile or tiles include that object. For example, as illustrated in FIG. 24, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoding device side can obtain, for example, the time at which a specific person appears in the video, and by fitting that with picture unit information, can identify a picture in which the object is present and the position of the object in the picture.

(Web Page Optimization)

Figure 25:
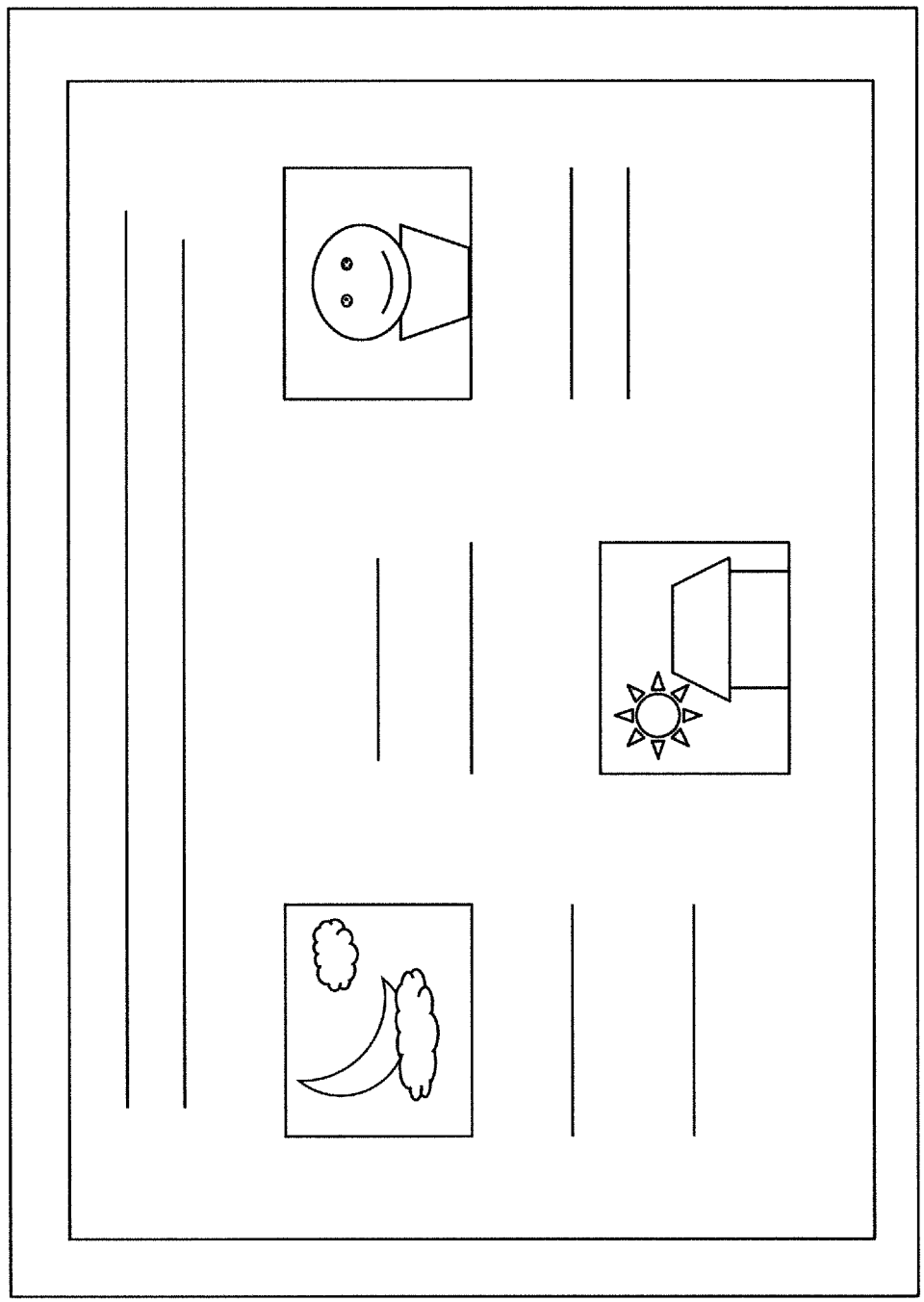
FIG. 25 illustrates an example of a display screen of a web page.
Figure 26:
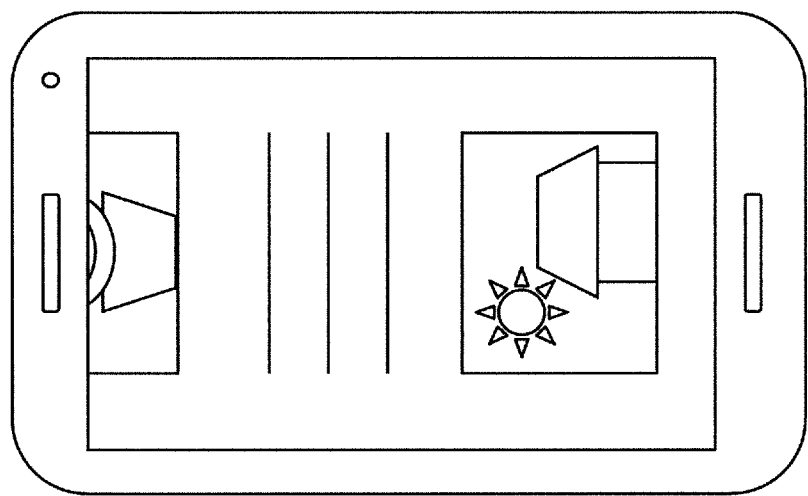
FIG. 26 illustrates an example of a display screen of a web page.

FIG. 25 illustrates an example of a display screen of a web page on, for example, computer ex111. FIG. 26 illustrates an example of a display screen of a web page on, for example, smartphone ex115. As illustrated in FIG. 25 and FIG. 26, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoding device) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

(Autonomous Driving)

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

(Streaming of Individual Content)

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture the head region may be replaced with another image as the person moves.

Moreover, since there is a demand for real-time viewing of content produced by individuals, which tends to be small in data size, the decoding device first receives the base layer as the highest priority and performs decoding and reproduction, although this may differ depending on bandwidth. When the content is reproduced two or more times, such as when the decoding device receives the enhancement layer during decoding and reproduction of the base layer and loops the reproduction, the decoding device may reproduce a high image quality video including the enhancement layer.

If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

OTHER USAGE EXAMPLES

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoding device (image encoding device) or the moving picture decoding device (image decoding device) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

(Hardware Configuration)

Figure 27:
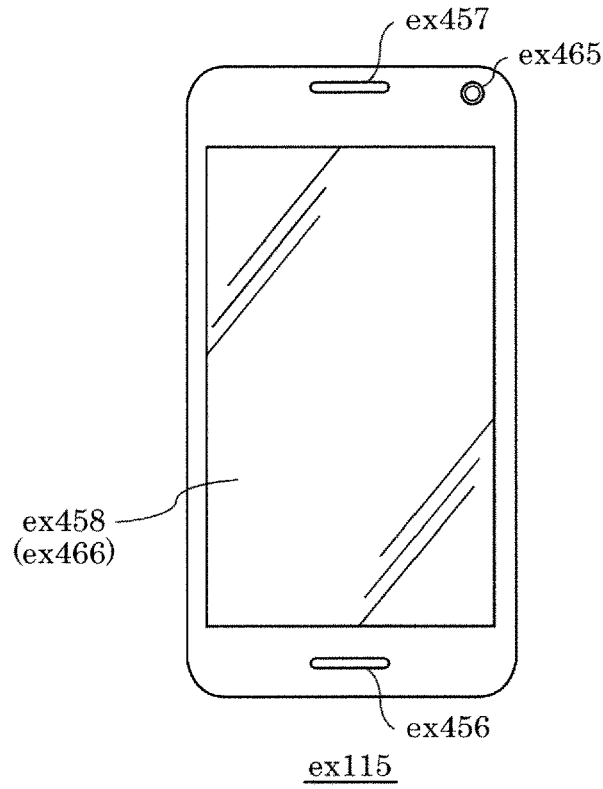
FIG. 27 illustrates one example of a smartphone.
Figure 28:
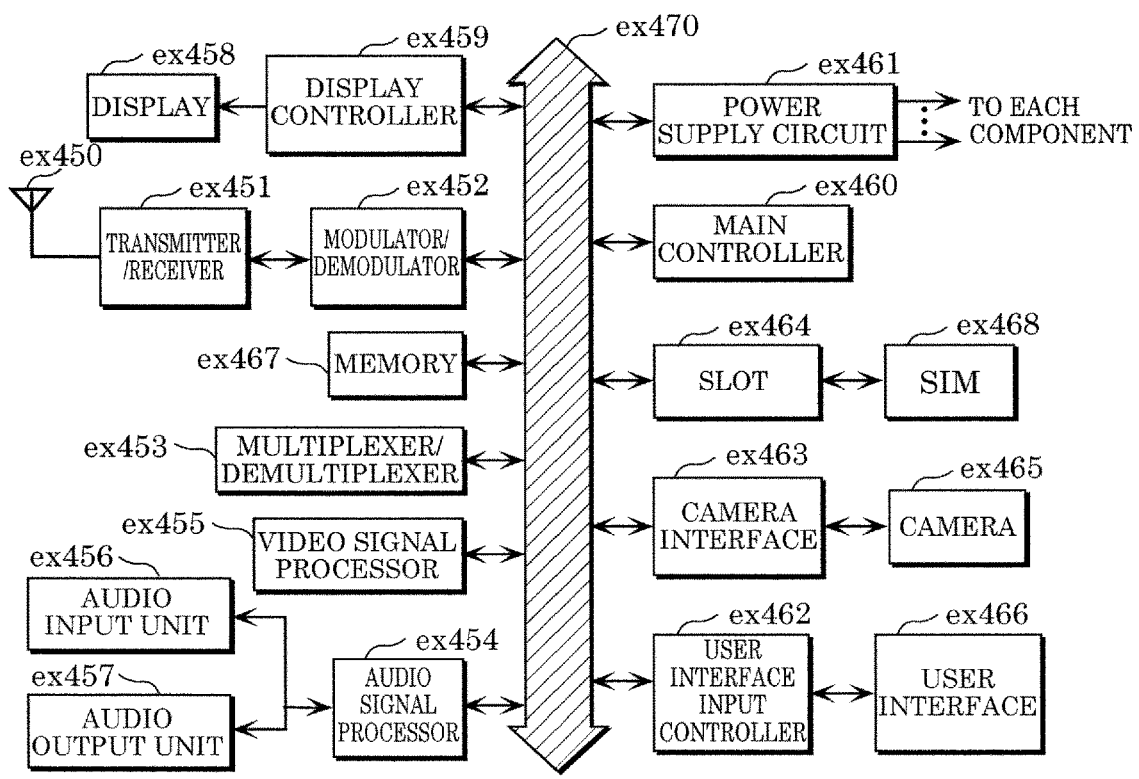
FIG. 28 is a block diagram illustrating a configuration example of a smartphone.

FIG. 27 illustrates smartphone ex115. FIG. 28 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoding device and a decoding device; a transmitter terminal including only an encoding device; and a receiver terminal including only a decoding device. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data may be received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

INDUSTRIAL APPLICABILITY

The present disclosure is applicable to encoding devices, decoding devices, encoding methods, and decoding methods.

The invention claimed is:
1. An encoding device comprising:
processing circuitry; and
memory,
wherein, by using the memory, the processing circuitry:
refers to, as a plurality of reference samples, either a plurality of pixels located on a left of a current block to be predicted or a plurality of pixels located above the current block to be predicted;
identifies, as a prediction parameter, at least one of a block size of the current block to be predicted and an intra prediction mode;
determines whether or not the prediction parameter identified is a predetermined parameter;
performs, when the determination is made that the prediction parameter identified is the predetermined parameter, filtering on a pixel value of a current reference sample to be processed included in the plurality of reference samples, using pixel values of the plurality of reference samples;
generates a prediction image of the current block to be predicted by performing intra prediction using the pixel value of the current reference sample to be processed, the pixel value having been filtered in the filtering; and
calculates a difference between the current block to be predicted and the prediction image, and
when performing the filtering, the processing circuitry:
calculates a weight with which each of the plurality of reference samples is multiplied, based on a distance between the reference sample and the current reference sample to be processed and a difference in pixel value between the reference sample and the current reference sample to be processed; and performs filtering on the pixel value of the current reference sample to be processed by weighted addition using each of the pixel values of the plurality of reference samples and the weight calculated for each reference sample.

2. The encoding device according to claim 1, wherein, when calculating the weight for each reference sample, the processing circuitry calculates a smaller weight for the reference sample when the distance is longer.

3. The encoding device according to claim 1, wherein, when calculating the weight for each reference sample, the processing circuitry calculates a smaller weight for the reference sample when the difference in pixel value is larger.

4. The encoding device according to claim 1, wherein the difference in pixel value is a difference in luminance value.

5. The encoding device according to claim 1, wherein, when calculating the weight for each reference sample, the processing circuitry calculates a smaller weight for the reference sample when a ratio of the distance with respect to a first parameter based on a block size of the current block to be predicted is larger.

6. The encoding device according to claim 5, wherein the first parameter indicates a larger value when the block size of the current block to be predicted is larger.

7. The encoding device according to claim 1, wherein, when calculating the weight for each reference sample, the processing circuitry calculates a smaller weight for the reference sample when a ratio of the difference in pixel value with respect to a second parameter based on contrast of the plurality of reference samples is larger.

8. The encoding device according to claim 7, wherein the second parameter indicates a smaller value when the contrast of the plurality of reference samples is lower.

9. The encoding device according to claim 1, wherein, when (i) positions of the current reference sample to be processed and a given one of the reference samples in an orthogonal coordinate system are respectively represented as (i, j) and (k, l),
(ii) the pixel value of the current reference sample to be processed and the pixel value of the given one of the reference samples are respectively represented as I (i, j) and I (k, l), and
(iii) a first parameter and a second parameter are respectively represented as σd and σγ,
the processing circuitry calculates, when calculating the weight for each reference sample, the weight of the given one of the reference samples according to an expression below,

[Math. 1]

$$\omega(i, j, k, l) = e^{\left(-\frac{(i-k)^2+(j-l)^2}{2\sigma_d^2} - \frac{\|I(i,j)-I(k,l)\|^2}{2\sigma_\gamma^2}\right)}$$

where the weight is denoted as ω (i, j, k, l).

10. A decoding device comprising:
processing circuitry; and
memory, wherein, by using the memory, the processing circuitry:
refers to, as a plurality of reference samples, either a plurality of pixels located on a left of an encoded current block to be predicted or a plurality of pixels located above the encoded current block to be predicted;
identifies, as a prediction parameter, at least one of a block size of the encoded current block to be predicted and an intra prediction mode;
determines whether or not the prediction parameter identified is a predetermined parameter;
performs, when the determination is made that the prediction parameter identified is the predetermined parameter, filtering on a pixel value of a current reference sample to be processed included in the plurality of reference samples, using pixel values of the plurality of reference samples;
generates a prediction image of the current block to be predicted by performing intra prediction using the pixel value of the current reference sample to be processed, the pixel value having been filtered in the filtering; and
adds the prediction image to a prediction error obtainable from a bitstream, and when performing the filtering, the processing circuitry:
calculates a weight with which each of the plurality of reference samples is multiplied, based on a distance between the reference sample and the current reference sample to be processed and a difference in pixel value between the reference sample and the current reference sample to be processed; and
performs filtering on the pixel value of the current reference sample to be processed by weighted addition using each of the pixel values of the plurality of reference samples and the weight calculated for each reference sample.

11. The decoding device according to claim 10, wherein, when calculating the weight for each reference sample, the processing circuitry calculates a smaller weight for the reference sample when the distance is longer.

12. The decoding device according to claim 10, wherein, when calculating the weight for each reference sample, the processing circuitry calculates a smaller weight for the reference sample when the difference in pixel value is larger.

13. The decoding device according to claim 10, wherein the difference in pixel value is a difference in luminance value.

14. The decoding device according to claim 10, wherein, when calculating the weight for each reference sample, the processing circuitry calculates a smaller weight for the reference sample when a ratio of the distance with respect to a first parameter based on a block size of the current block to be predicted is larger.

15. The decoding device according to claim 14, wherein the first parameter indicates a larger value when the block size of the current block to be predicted is larger.

16. The decoding device according to claim 10, wherein, when calculating the weight for each reference sample, the processing circuitry calculates a smaller weight for the reference sample when a ratio of the difference in pixel value with respect to a second parameter based on contrast of the plurality of reference samples is larger.

17. The decoding device according to claim 16,
wherein the second parameter indicates a smaller value when the contrast of the plurality of reference samples is lower.

18. The decoding device according to claim 10,
wherein, when (i) positions of the current reference sample to be processed and a given one of the reference samples in an orthogonal coordinate system are respectively represented as i, j) and (k, l),
(ii) the pixel value of the current reference sample to be processed and the pixel value of the given one of the reference samples are respectively represented as I (i, j) and I (k, l), and
(iii) a first parameter and a second parameter are respectively represented as σd and σγ,
the processing circuitry calculates, when calculating the weight for each reference sample, the weight of the given one of the reference samples according to an expression below,

[Math. 2]

$$\omega(i, j, k, l) = e^{\left(-\frac{(i-k)^2+(j-l)^2}{2\sigma_d^2} - \frac{\|I(i,j)-I(k,l)\|^2}{2\sigma_\gamma^2}\right)}$$

where the weight is denoted as ω (i, j, k, l).

19. An encoding method comprising:
referring to, as a plurality of reference samples, either a plurality of pixels located on a left of a current block to be predicted or a plurality of pixels located above the current block to be predicted;
identifying, as a prediction parameter, at least one of a block size of the current block to be predicted and an intra prediction mode;
determining whether or not the prediction parameter identified is a predetermined parameter;
performing, when the determination is made that the prediction parameter identified is the predetermined parameter, filtering on a pixel value of a current reference sample to be processed included in the plurality of reference samples, using pixel values of the plurality of reference samples;
generating a prediction image of the current block to be predicted by performing intra prediction using the pixel value of the current reference sample to be processed, the pixel value having been filtered in the filtering; and
calculating a difference between the current block to be predicted and the prediction image, and
wherein in the performing filtering:
calculating a weight with which each of the plurality of reference samples is multiplied, based on a distance between the reference sample and the current reference sample to be processed and a difference in pixel value between the reference sample and the current reference sample to be processed; and
performing filtering on the pixel value of the current reference sample to be processed by weighted addition using each of the pixel values of the plurality of reference samples and the weight calculated for each reference sample.

20. A decoding method comprising:
referring to, as a plurality of reference samples, either a plurality of pixels located on a left of an encoded current block to be predicted or a plurality of pixels located above the encoded current block to be predicted;
identifying, as a prediction parameter, at least one of a block size of the encoded current block to be predicted and an intra prediction mode;
determining whether or not the prediction parameter identified is a predetermined parameter;
performing, when the determination is made that the prediction parameter identified is the predetermined parameter, filtering on a pixel value of a current reference sample to be processed included in the plurality of reference samples, using pixel values of the plurality of reference samples;
generating a prediction image of the current block to be predicted by performing intra prediction using the pixel value of the current reference sample to be processed, the pixel value having been filtered in the filtering; and
adding the prediction image to a prediction error obtainable from a bitstream, and
wherein in the performing filtering:
calculating a weight with which each of the plurality of reference samples is multiplied, based on a distance between the reference sample and the current reference sample to be processed and a difference in pixel value between the reference sample and the current reference sample to be processed; and
performing filtering on the pixel value of the current reference sample to be processed by weighted addition using each of the pixel values of the plurality of reference samples and the weight calculated for each reference sample.

* * * * *